United States Patent
Sato et al.

(10) Patent No.: US 9,496,979 B2
(45) Date of Patent: Nov. 15, 2016

(54) SPACE SWITCH DEVICE

(75) Inventors: Ken-ichi Sato, Nagoya (JP); Hiroshi Hasegawa, Nagoya (JP);
(Continued)

(73) Assignees: NATIONAL UNIVERSITY CORPORATION NAGOYA UNIVERSITY, Nagoya (JP);
(Continued)

( * ) Notice: Subject to any disclaimer, the term of this patent is extended or adjusted under 35 U.S.C. 154(b) by 40 days.

(21) Appl. No.: 14/236,419

(22) PCT Filed: Aug. 2, 2012

(86) PCT No.: PCT/JP2012/069731
§ 371 (c)(1),
(2), (4) Date: Feb. 21, 2014

(87) PCT Pub. No.: WO2013/018867
PCT Pub. Date: Feb. 7, 2013

(65) Prior Publication Data
US 2014/0178068 A1    Jun. 26, 2014

(30) Foreign Application Priority Data
Aug. 3, 2011  (JP) ................. 2011-170562

(51) Int. Cl.
*H04J 14/00*   (2006.01)
*H04J 14/02*   (2006.01)
*H04Q 11/00*   (2006.01)

(52) U.S. Cl.
CPC ............ *H04J 14/02* (2013.01); *H04J 14/0212* (2013.01); *H04J 14/0213* (2013.01);
(Continued)

(58) Field of Classification Search
None
See application file for complete search history.

(56) References Cited

U.S. PATENT DOCUMENTS

2002/0015551 A1*  2/2002  Tsuyama et al. ............... 385/17
2004/0165816 A1   8/2004  Oikawa et al.
(Continued)

FOREIGN PATENT DOCUMENTS

JP   2002-101432 A    4/2002
JP   A 2004-260583    9/2004
(Continued)

OTHER PUBLICATIONS

Oct. 9, 2012 Search Report issued in International Patent Application No. PCT/JP2012/069731 (with translation).
Dec. 15, 2015 Office Action issued in Japanese Patent Application No. 2013-526958.

*Primary Examiner* — Ken N Vanderpuye
*Assistant Examiner* — David Lambert
(74) *Attorney, Agent, or Firm* — Oliff PLC

(57) ABSTRACT

Disclosed is a spatial switching apparatus having a plurality of input terminals, an input optical signal of a single wavelength being input to each of the plurality of the input terminals, and a plurality of output terminals an output optical signal of a single wavelength being output from each of the plurality of the output terminals. The apparatus includes a signal wavelength converting portion having an electric signal converting element converting the input optical signal into an electric signal and a variable wavelength laser, the signal wavelength converting portion using the variable wavelength laser to convert an electric signal converted by the electric signal converting element into an optical signal of an arbitrary wavelength; and a spatial switching portion having a plurality of first cyclic AWGs performing output from a plurality of output ports corresponding to wavelengths of a plurality of input signals input from the variable wavelength laser.

6 Claims, 27 Drawing Sheets

(75) Inventors: Tomonobu Niwa, Nagoya (JP); Hiroshi Takahashi, Tokyo (JP); Toshio Watanabe, Tokyo (JP)

(73) Assignees: NIPPON TELEGRAPH AND TELEPHONE CORPORATION, Tokyo (JP)

(52) U.S. Cl.
CPC ....... *H04J 14/0217* (2013.01); *H04Q 11/0005* (2013.01); *H04Q 2011/0016* (2013.01); *H04Q 2011/0024* (2013.01); *H04Q 2011/0035* (2013.01); *H04Q 2011/0052* (2013.01)

(56) References Cited

U.S. PATENT DOCUMENTS

| | | | |
|---|---|---|---|
| 2007/0098319 A1* | 5/2007 | Jennen | 385/17 |
| 2007/0212066 A1 | 9/2007 | Winh et al. | |

FOREIGN PATENT DOCUMENTS

| | | |
|---|---|---|
| JP | A 2006-217079 | 8/2006 |
| JP | A 2007-243508 | 9/2007 |
| JP | A 2008-252664 | 10/2008 |

\* cited by examiner

FIG.9

| SPATIAL SWITCH SIZE | USED CYCLIC AWG | | NUMBER OF USED WAVELENGTHS |
| --- | --- | --- | --- |
| | AWG1 | AWG2 | |
| 140 × 140 | 7 × 7 | 20 × 20 | 140 |
| 136 × 136 | 8 × 8 | 17 × 17 | 136 |
| 133 × 133 | 7 × 7 | 19 × 19 | 133 |
| 132 × 132 | 11 × 11 | 12 × 12 | 132 |
| 130 × 130 | 10 × 10 | 13 × 13 | 130 |
| 126 × 126 | 7 × 7 | 18 × 18 | 126 |
| | 9 × 9 | 14 × 14 | |
| 119 × 119 | 7 × 7 | 17 × 17 | 119 |
| 117 × 117 | 9 × 9 | 13 × 13 | 117 |
| 114 × 114 | 6 × 6 | 19 × 19 | 114 |
| 112 × 112 | 7 × 7 | 16 × 16 | 112 |
| 110 × 110 | 10 × 10 | 11 × 11 | 110 |
| 105 × 105 | 7 × 7 | 15 × 15 | 105 |
| 104 × 104 | 8 × 8 | 13 × 13 | 104 |
| 99 × 99 | 9 × 9 | 11 × 11 | 99 |
| 95 × 95 | 5 × 5 | 19 × 19 | 95 |
| 91 × 91 | 7 × 7 | 13 × 13 | 91 |
| 90 × 90 | 5 × 5 | 18 × 18 | 90 |
| | 9 × 9 | 10 × 10 | |
| 88 × 88 | 8 × 8 | 11 × 11 | 88 |
| 85 × 85 | 5 × 5 | 17 × 17 | 85 |
| 84 × 84 | 7 × 7 | 12 × 12 | 84 |

| SPATIAL SWITCH SIZE | USED CYCLIC AWG | | NUMBER OF 1×2 SWITCHES | NUMBER OF USED WAVELENGTHS |
|---|---|---|---|---|
| | AWG1 | AWG2 | | |
| 144 × 288 | 16 × 16 | 18 × 18 | 144 | 144 |
| 140 × 280 | 14 × 14 | 20 × 20 | 140 | 140 |
| 132 × 264 | 12 × 12 | 22 × 22 | 132 | 132 |
| 130 × 260 | 10 × 10 | 26 × 26 | 130 | 130 |
| 126 × 256 | 14 × 14 | 18 × 18 | 126 | 126 |
| 112 × 224 | 14 × 14 | 16 × 16 | 112 | 112 |
| 110 × 220 | 10 × 10 | 22 × 22 | 110 | 110 |
| 104 × 208 | 8 × 8 | 26 × 26 | 104 | 104 |
| 90 × 180 | 10 × 10 | 18 × 18 | 90 | 90 |
| 88 × 176 | 8 × 8 | 22 × 22 | 88 | 88 |
| 84 × 168 | 12 × 12 | 14 × 14 | 84 | 84 |
| 80 × 160 | 10 × 10 | 16 × 16 | 80 | 80 |
| 72 × 144 | 8 × 8 | 18 × 18 | 72 | 72 |
| 70 × 140 | 10 × 10 | 14 × 14 | 70 | 70 |
| 60 × 120 | 10 × 10 | 12 × 12 | 60 | 60 |
| 56 × 112 | 8 × 8 | 14 × 14 | 56 | 56 |

| SPATIAL SWITCH SIZE | USED CYCLIC AWG | | NUMBER OF 1×2 SWITCHES | NUMBER OF USED WAVELENGTHS |
|---|---|---|---|---|
| | AWG1 | AWG2 | | |
| 288 × 288 | 16 × 16 | 18 × 18 | 288 | 144 |
| 280 × 280 | 14 × 14 | 20 × 20 | 280 | 140 |
| 264 × 264 | 12 × 12 | 22 × 22 | 264 | 132 |
| 260 × 260 | 10 × 10 | 26 × 26 | 260 | 130 |
| 256 × 256 | 14 × 14 | 18 × 18 | 256 | 126 |
| 224 × 224 | 14 × 14 | 16 × 16 | 224 | 112 |
| 220 × 220 | 10 × 10 | 22 × 22 | 220 | 110 |
| 208 × 208 | 8 × 8 | 26 × 26 | 208 | 104 |
| 180 × 180 | 10 × 10 | 18 × 18 | 180 | 90 |
| 176 × 176 | 8 × 8 | 22 × 22 | 176 | 88 |
| 168 × 168 | 12 × 12 | 14 × 14 | 168 | 84 |
| 160 × 160 | 10 × 10 | 16 × 16 | 160 | 80 |
| 144 × 144 | 8 × 8 | 18 × 18 | 144 | 72 |
| 140 × 140 | 10 × 10 | 14 × 14 | 140 | 70 |
| 120 × 120 | 10 × 10 | 12 × 12 | 120 | 60 |
| 112 × 112 | 8 × 8 | 14 × 14 | 112 | 56 |

| SPATIAL SWITCH SIZE | USED CYCLIC AWG | | NUMBER OF 1×3 SWITCHES | NUMBER OF USED WAVELENGTHS |
|---|---|---|---|---|
| | AWG1 | AWG2 | | |
| 135×405 | 15×15 | 27×27 | 135 | 135 |
| 126×378 | 18×18 | 21×21 | 126 | 126 |
| 120×360 | 15×15 | 24×24 | 120 | 120 |
| 105×315 | 15×15 | 21×21 | 105 | 105 |
| 84×252 | 12×12 | 21×21 | 84 | 84 |
| 72×216 | 9×9 | 24×24 | 72 | 72 |
| 63×189 | 9×9 | 21×21 | 63 | 63 |
| 60×180 | 12×12 | 15×15 | 60 | 60 |

| SPATIAL SWITCH SIZE | USED CYCLIC AWG | | NUMBER OF 1×3 SWITCHES | NUMBER OF USED WAVELENGTHS |
|---|---|---|---|---|
| | AWG1 | AWG2 | | |
| 405 × 405 | 15 × 15 | 27 × 27 | 405 | 135 |
| 378 × 378 | 18 × 18 | 21 × 21 | 378 | 126 |
| 360 × 360 | 15 × 15 | 24 × 24 | 360 | 120 |
| 315 × 315 | 15 × 15 | 21 × 21 | 315 | 105 |
| 252 × 252 | 12 × 12 | 21 × 21 | 252 | 84 |
| 216 × 216 | 9 × 9 | 24 × 24 | 216 | 72 |
| 189 × 189 | 9 × 9 | 21 × 21 | 189 | 63 |
| 180 × 180 | 12 × 12 | 15 × 15 | 180 | 60 |

| SPATIAL SWITCH SIZE | USED CYCLIC AWG | | NUMBER OF 1×4 SWITCHES | NUMBER OF USED WAVELENGTHS |
|---|---|---|---|---|
| | AWG1 | AWG2 | | |
| 140 × 560 | 20 × 20 | 28 × 28 | 280 | 140 |
| 120 × 480 | 20 × 20 | 24 × 24 | 240 | 120 |
| 112 × 448 | 16 × 16 | 28 × 28 | 224 | 112 |
| 96 × 384 | 12 × 12 | 32 × 32 | 198 | 96 |
| 84 × 336 | 12 × 12 | 28 × 28 | 168 | 84 |
| 80 × 320 | 16 × 16 | 20 × 20 | 160 | 80 |
| 72 × 288 | 12 × 12 | 24 × 24 | 144 | 72 |
| 60 × 240 | 12 × 12 | 20 × 20 | 120 | 60 |
| 48 × 192 | 12 × 12 | 16 × 16 | 96 | 48 |

| SPATIAL SWITCH SIZE | USED CYCLIC AWG | | NUMBER OF 1×4 SWITCHES | NUMBER OF USED WAVELENGTHS |
|---|---|---|---|---|
| | AWG1 | AWG2 | | |
| 560 × 560 | 20 × 20 | 28 × 28 | 560 | 140 |
| 480 × 480 | 20 × 20 | 24 × 24 | 480 | 120 |
| 448 × 448 | 16 × 16 | 28 × 28 | 448 | 112 |
| 384 × 384 | 12 × 12 | 32 × 32 | 384 | 96 |
| 336 × 336 | 12 × 12 | 28 × 28 | 336 | 84 |
| 320 × 320 | 16 × 16 | 20 × 20 | 320 | 80 |
| 288 × 288 | 12 × 12 | 24 × 24 | 288 | 72 |
| 240 × 240 | 12 × 12 | 20 × 20 | 240 | 60 |
| 192 × 192 | 12 × 12 | 16 × 16 | 192 | 48 |

| SPATIAL SWITCH SIZE | USED CYCLIC AWG | | NUMBER OF 1×5 SWITCHES | NUMBER OF USED WAVELENGTHS |
|---|---|---|---|---|
| | AWG1 | AWG2 | | |
| 100 × 500 | 20 × 20 | 25 × 25 | 100 | 100 |
| 75 × 375 | 15 × 15 | 25 × 25 | 75 | 75 |
| 60 × 300 | 15 × 15 | 20 × 20 | 60 | 60 |
| 50 × 250 | 10 × 10 | 25 × 25 | 50 | 50 |
| 30 × 150 | 10 × 10 | 15 × 15 | 30 | 30 |

| SPATIAL SWITCH SIZE | USED CYCLIC AWG | | NUMBER OF 1×5 SWITCHES | NUMBER OF USED WAVELENGTHS |
|---|---|---|---|---|
| | AWG1 | AWG2 | | |
| 500 × 500 | 20 × 20 | 25 × 25 | 500 | 100 |
| 375 × 375 | 15 × 15 | 25 × 25 | 375 | 75 |
| 300 × 300 | 15 × 15 | 20 × 20 | 300 | 60 |
| 250 × 250 | 10 × 10 | 25 × 25 | 250 | 50 |
| 150 × 150 | 10 × 10 | 15 × 15 | 150 | 30 |

SPACE SWITCH DEVICE

The present invention relates to a spatial switching apparatus used for a termination process of an optical path network capable of outputting an input optical signal from a desired output port, and used in a data center.

BACKGROUND ART

An optical path network is known that transmits wavelength division multiplexing (WDM) light including a plurality of for example, M, wavelength groups each formed by multiplexing lights of N multiple wavelengths respectively corresponding to a plurality of, for example, N, wavelength channels (wave channels or light paths) acquired by dividing a predetermined communication wavelength band by, for example, 100 GHz, via a plurality of (K) optical fibers in parallel. Anode switching a route on the basis of a wavelength group or switching a route on the basis of a wavelength in such an optical path network uses an optical matrix switching apparatus that is a relatively large-scale multi-input multi-output optical switching apparatus for extracting and dropping an optical signal of a predetermined wavelength from KMN wavelength channels included in the wavelength groups transmitted through the K optical fibers to an electric layer EL performing signal conversion between an electric signal and a wavelength-based optical signal by using a router etc., for the signal for which the node is the destination, or for adding an optical signal converted from an electric signal by a predetermined router to the wavelength division multiplexing light in a predetermined optical fiber. Patent Document 1 described an example thereof.

The node of the optical path network desirably has a function enabling the dropping of any wavelength channel in wavelength division multiplexing light in any input fiber and enabling an assignment of a wavelength channel added from the node to wavelength division multiplexing light of an arbitrary output fiber between a wavelength level transmitted through optical paths and an electric level at the time of an optical signal termination process, and a function having no mutual effect between a wavelength and connection to an optical transceiver, i.e., a colorless function, a directionless function, and a contentionless function.

PRIOR ART DOCUMENT

Patent Document

Patent Document 1: Japanese Laid-Open Patent Publication No. 2008-252664

SUMMARY OF TEE INVENTION

Problem to be Solved by the Invention

An optical terminating apparatus of the node requires a large-scale multi-input multi-output optical matrix switch for implementing the colorless and directionless function. For example, when the wavelength division multiplexing light including M wavelength groups each acquired by multiplexing lights of N wavelength channels, or a total of MN wavelength division multiplexing light signals, is transmitted through each of K optical fibers in parallel, if a rate of drop to or addition from an electric layer (electric level) EL for performing signal conversion between an electric signal and a wavelength-based optical signal through an optical router etc., is a predetermined add/drop rate z, an optical matrix switch having a large scale of KMN×zKMN must be disposed on the drop side between K wavelength demultiplexers (e.g., arrayed waveguide gratings AWG) for demultiplexing the wavelength division multiplexing light from the optical fibers into respective wavelengths and the electric layer capable of converting zKMN wavelength channels into electric signals as depicted in FIG. 38, for example. At the same time, an optical matrix switch having a large scale of zKMN×KMN must be disposed on the add side between K wavelength multiplexers (e.g., arrayed waveguide gratings AWG) for multiplexing added wavelengths into wavelength division multiplexing light to any optical fiber and the electric layer capable of converting zKMN electric signals into wavelength channels.

In this regard, instead of the optical matrix switch having a large scale of KMN×zKMN, it is conceivable that an optical switching apparatus is formed and disposed by combining a variable wavelength laser capable of converting a signal of an arbitrary wavelength into a signal of an arbitrary wavelength and a cyclic arrayed waveguide grating (cyclic AWG: cyclic wavelength demultiplexer/multiplexer) capable of outputting a signal of multiple wavelengths input to a predetermined input port from a plurality of output ports disposed for respective wavelengths in parallel. In this case, a large-scale spatial switch can be configured that can convert an input wavelength into an arbitrary wavelength by using the variable wavelength laser for routing.

However, the cyclic AWG used in the spatial switch as described above actually increases in scale and, as the number of input/output terminals increases, a significant gap appears between a center value of a spectrum of each demultiplexed or multiplexed wavelength output from each terminal and a desired center wavelength of design. Therefore, the spatial switch formed by using the cyclic AWG has a limit of increase in scale and it is effectively difficult to realize a spatial optical switch having a requested scale for practical use.

The present invention was conceived in view of the situations and it is therefore an object of the present invention to provide a large-scale spatial switching apparatus having a routing function equivalent to the case of using a large-scale cyclic AWG and having characteristics making a deviation of a center frequency of an output demultiplexed or multiplexed wavelength smaller. A large-scale spatial switch described in this description is widely applied to an optical changeover switch etc., in optical signal transmission in a data center, for example.

Means for Solving the Problem

To achieve the object, the present invention provides (a) a spatial switching apparatus having a plurality of input terminals including a drop signal to an electric layer or an add signal from the electric layer and a plurality of output terminals, comprising: (b) a signal wavelength converting portion having an electric signal converting element converting the input optical signal into an electric signal and a variable wavelength laser, the signal wavelength converting portion using the variable wavelength laser to convert an electric signal converted by the electric signal converting element into an optical signal of an arbitrary wavelength; and (c) a spatial switching portion having a plurality of first cyclic AWGs performing output from an output port corresponding to a wavelength of an input signal input from the variable wavelength laser and second cyclic AWGs having the same total number of input ports as the total number of the output ports of the plurality of the first cyclic AWGs, the spatial switching portion routing and outputting the input signal from an output port corresponding to a wavelength of the input signal out of output ports of the second cyclic AWGs.

Effects of the Invention

According to the spatial switching apparatus of the present invention configured as described above, since the spatial switching portion is made up of pluralities of the first cyclic AWGs and the second cyclic AWGs of small scales having relatively high performance in terms of a deviation of a center frequency, the large-scale spatial switch can be acquired that has a routing function equivalent to the case of using a large-scale cyclic AWG and that has characteristics making a deviation of a center frequency of a demultiplexed or multiplexed wavelength smaller.

Preferably, the first cyclic AWGs and the second cyclic AWGs have the numbers of the input/output ports relatively prime to each other. As a result, since no common factor (the greatest common divisor) exists between the numbers of the input/output ports of the first cyclic AWGs and the second cyclic AWGs, it is not necessary to prepare a plurality of changeover switches assigning the input ports of the first cyclic AWGs corresponding to a common factor to one input signal so as to selectively input the one input signal to the input ports corresponding to the common factor.

Preferably, a number of the spatial switching portions is n, and 1×n optical switches are disposed between the signal wavelength converting portion and the n spatial switching portions. As a result, a larger-scale spatial switching apparatus can be configured by using the n spatial switching portions.

Preferably, an m×1 optical combiner is disposed between the 1×n optical switches and the first cyclic AWGs, and the m×1 optical combiner multiplexes and inputs output signals of m 1×n optical switches to one input port of the first cyclic AWGs. As a result, a larger-scale spatial switching apparatus can be configured by using the n spatial switching portions.

Preferably, n and m are equal in the spatial switching apparatus. As a result, a larger-scale spatial switching apparatus can be configured by using the n spatial switching portions.

Preferably, the first cyclic AWGs and the second cyclic AWGs have a common factor of the respective numbers of the input/output ports. As a result, by preparing a plurality of changeover switches assigning the input ports of the first cyclic AWGs corresponding to the common factor to one input signal so as to selectively input the one input signal to the input ports of the common factor, the spatial switching portion can be made up of the first cyclic AWGs and the second cyclic AWGs in a mutual relationship of having a common factor of the numbers of the output ports.

Preferably, 1×n optical switches are disposed between the signal wavelength converting portion and the spatial switching portion, and n is the same number as the common factor between the numbers of the input/output ports of the first cyclic AWGs and the second cyclic AWGs. As a result, although n of the input ports of the first cyclic AWGs are occupied by input from the one signal wavelength converting portion, the spatial switching portion can be made up of the first cyclic AWGs and the second cyclic AWGs in a mutual relationship of having a common factor of the numbers of the output ports.

Preferably, an m×1 optical combiner is disposed between the 1×n optical switches and the first cyclic AWGs, and the m×1 optical combiner multiplexes and inputs output signals of a plurality of 1×n optical switches to one input port of the first cyclic AWGs. As a result, it is advantageous that, even when the first cyclic AWGs and the second cyclic AWGs mutually have a common factor of the numbers of the input/output ports, n of the input ports of the first cyclic AWG are not occupied by input from the one signal wavelength converting portion.

Preferably, n and m are equal in the spatial switching apparatus. As a result, it is advantageous that, even when the first cyclic AWGs and the second cyclic AWGs mutually have a common factor of the numbers of the input/output ports, n of the input ports of the first cyclic AWG are not occupied by input from the one signal wavelength converting portion.

BRIEF DESCRIPTION OF THE DRAWINGS

FIG. 9 depicts an example of input/output scales employable for the first switching apparatus AWG 1 and the second switching apparatus AWG 2 making up the spatial switching portion SSW used in the embodiment of FIG. 6 and an example of the number of routable wavelengths in combinations thereof.

MODES FOR CARRYING OUT THE INVENTION

First Embodiment

Figure 1:
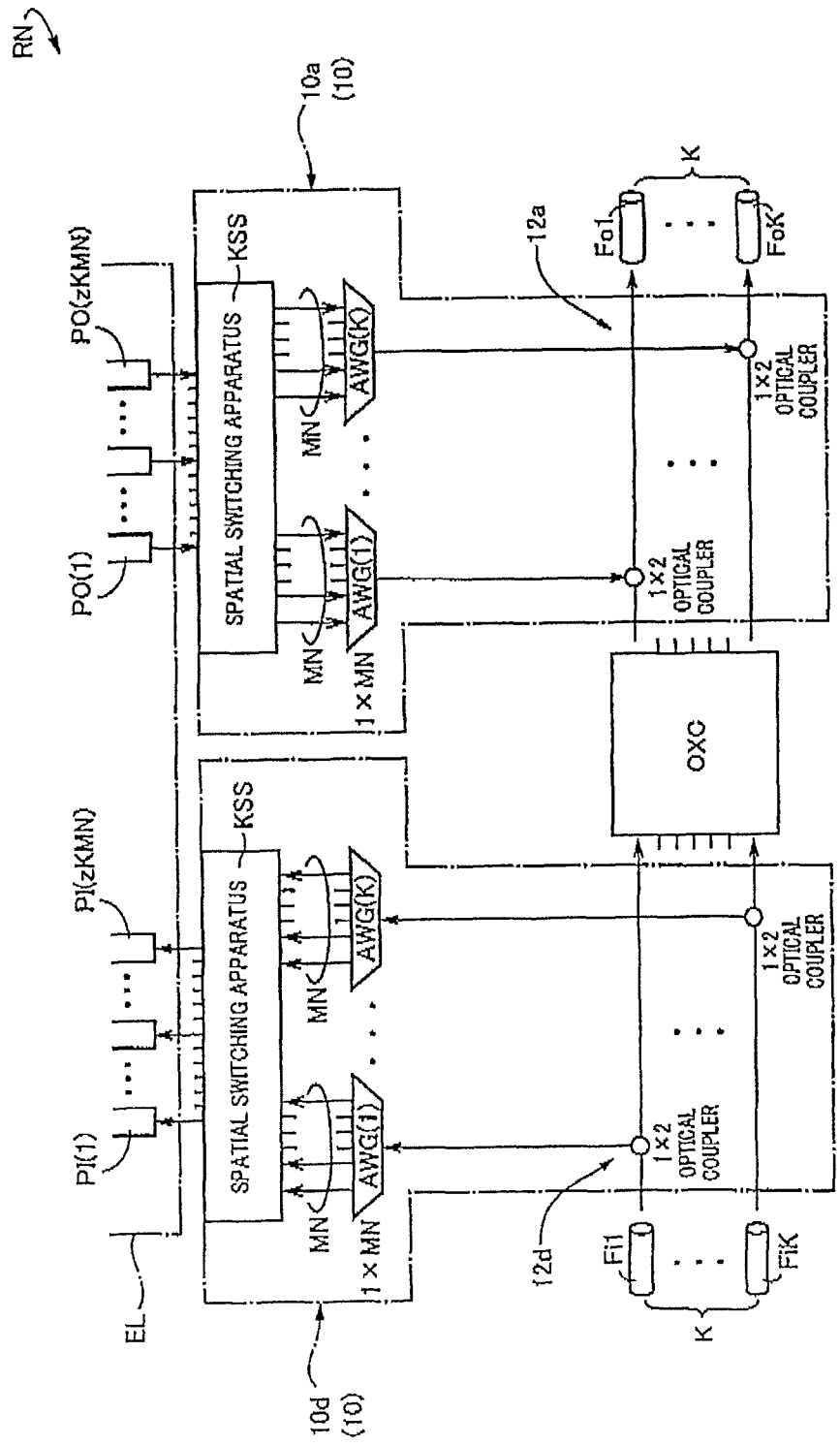
FIG. 1 is a schematic diagram for explaining a termination process apparatus of a node RN of an optical path network including a spatial switching apparatus KSS of an embodiment in the present invention.

FIG. 1 is a schematic of a configuration of a node RN of an optical path network connected in a netlike manner through an optical fiber bundle made up of a plurality of, for example, K, optical fibers FI to FK. This node RN is disposed between K input-side optical fibers Fi1, Fi2, . . . FiK and K output-side optical fibers Fo1, Fo2, . . . FoK and includes an optical path cross-connect apparatus OXC and an optical signal terminating apparatus 10.

In this embodiment, one wavelength group WB is formed by multiplexing lights of N multiple wavelengths respectively corresponding to a plurality of wavelength channels (wave channels or light paths) acquired by dividing a predetermined communication wavelength band by, for example, 100 GHz, and M (M sets of) wavelength groups WB are multiplexed to form one wavelength division multiplexing (WDM) light, which is transmitted through each of optical fibers. Therefore, WB11 to WB1M, WB21 to WB2M, . . . WBK1 to WBKM are input in parallel via respective input-side optical fibers Fi1, Fi2, . . . FiK, and new routed wavelength groups WB11 to WB1M, WB21 to WB2M, . . . WBK1 to WBKM are output in parallel via respective output-side optical fibers Fo1, Fo2, . . . FoK. K, M, and N are integers and are set to K=4 to 8, M=8 to 10, and N=10 to 12, for example.

Figure 2:
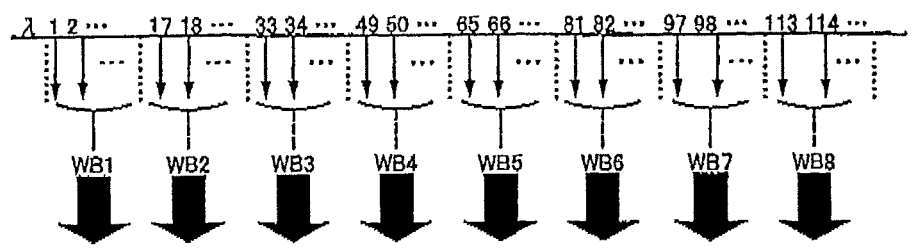
FIG. 2 is a diagram for explaining a configuration in a case of using wavelength groups out of wavelength division multiplexing lights transmitted through the optical path network of FIG. 1, and using consecutively-arranged wavelength groups.
Figure 3:
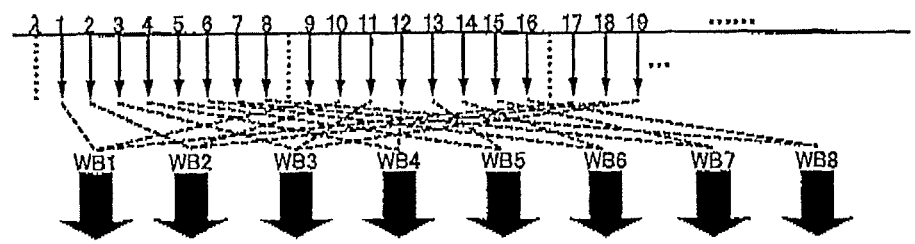
FIG. 3 is a schematic diagram for explaining a configuration of an essential part in a case of using wavelength groups out of wavelength division multiplexing lights transmitted through the optical path network of FIG. 1, and using dispersively-arranged wavelength groups.

For example, wavelengths of wavelength channels included in the wavelength group B11 are denoted by λ111 to λ11N; wavelengths of wavelength channels included in the wavelength group B12 are denoted by λ121 to λ12N; wavelengths of wavelength channels included in the wavelength group B1M are denoted by λ1M1 to λ1MN; wavelengths of wavelength channels included in the wavelength group BKM are denoted by λKM1 to λKMN; and these wavelengths, for example, λ121 to λ12N may be wavelengths increased sequentially and consecutively to each other or may be dispersive wavelengths. FIGS. 2 and 3 depict configuration examples of wavelengths λ making up the wavelength groups. FIG. 2 depicts an example of consecutively-arranged wavelength groups, and a plurality of sequentially selected wavelength groups are set such that one group is made up of 16 wavelengths consecutive to each other selected from consecutive wavelengths. FIG. 3 depicts an example of dispersively-arranged wavelength groups and, wavelength groups are formed by setting each wavelength group as wavelengths dispersively selected from respective sets of eight consecutive wavelengths. Each group is configured such that wavelengths are made up of those discontinuously different within the wavelength group as well as between the wavelength groups.

Figure 4:
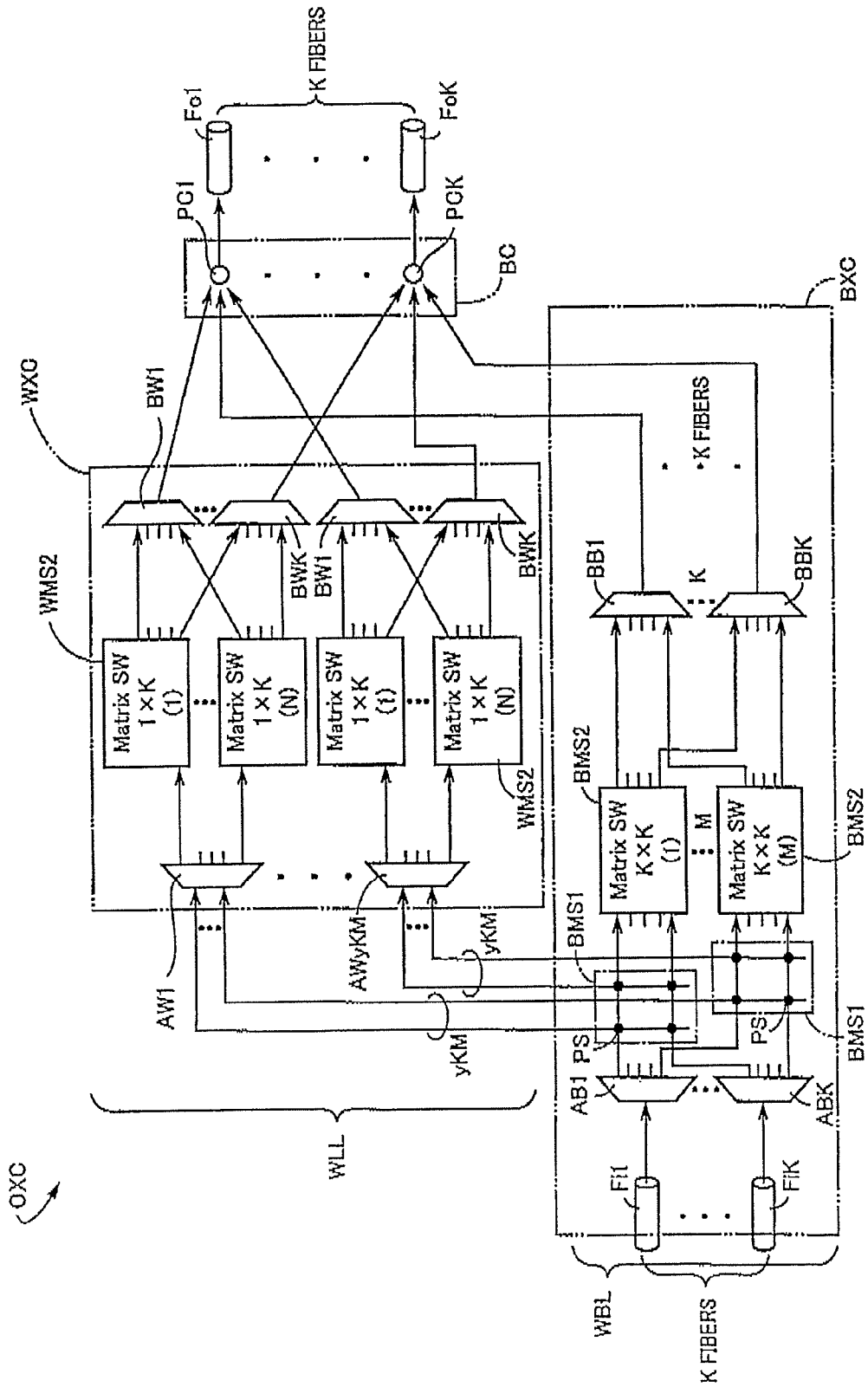
FIG. 4 is a diagram for explaining an example of a configuration of an optical path cross-connect apparatus (OXC part in FIG. 1) included in the node RN of FIG. 1.

The optical path cross-connect apparatus OXC extracts a predetermined wavelength included in wavelength division multiplexing lights respectively input via the K input-side optical fibers Fi1, Fi2, . . . FiK and incorporates the wavelength into another desired wavelength division multiplexing light for transmission via a desired fiber. This optical path cross-connect apparatus OXC is, for example, a layered optical path cross-connect apparatus depicted in FIG. 4 performing routing (route-switching) on the basis of a wavelength group on a wavelength group level WBL and performing routing (route-switching) on the basis of a wavelength on a wavelength level WLL. This path cross-connect apparatus OXC includes a wavelength-group cross-connect portion BXC performing the wavelength-group-based routing of the wavelength division multiplexing lights respectively input via the K input-side optical fibers Fi1, Fi2, . . . FiK, i.e., the K sets of the wavelength groups WB11 to WB1M, WB21 to WB2M, . . . WBK1 to WBKM each consisting of M wavelength groups such that each set is output to one of the K output-side optical fibers Fo1, Fo2, . . . FoK while dropping a predetermined number, i.e., a preset drop/add rate y (arbitrary number from 0 to 1), of drop wavelength groups out of the K input wavelength groups WB11 to WB1M, WB21 to WB2M, . . . WBK1 to WBKM to a wavelength cross-connect portion WXC; the wavelength cross-connect portion WXC performing the wavelength-based routing of a plurality of wavelengths making up each of a predetermined rate of wavelength groups dropped at the preset drop/add rate y (arbitrary number from 0 to 1) to form and output a predetermined rate of added wavelength group; and a wavelength group multiplexer BC multiplexing the wavelength groups having the routes switched by the wavelength-group cross-connect portion BXC and respectively output to the K output-side optical fibers Fo1, Fo2, . . . FoK with the added wavelength groups rearranged by the wavelength cross-connect portion WXC so that the multiplexed wavelength groups are respectively input to the K output-side optical fibers Fo1, Fo2, . . . FoK. Although the configuration of the optical path cross-connect apparatus OXC is described as a configuration using the wavelength groups in the above description, the wavelength groups may not be used and only the wavelength cross-connect portion WXC may be used for switching the routes of the wavelength division multiplexing lights respectively input via the K input-side optical fibers Fi1, Fi2, . . . FiK on the basis of a wavelength such that respective wavelengths are output one-by-one to the K output-side optical fibers Fo1, Fo2, . . . FoK.

Returning to FIG. 1, the optical signal terminating apparatus 10 includes a drop-side optical signal terminating apparatus 10d selecting a predetermined (arbitrary) drop wavelength from the wavelength division multiplexing lights respectively input via the K input-side optical fibers Fi1, Fi2, . . . FiK, i.e., the M wavelength groups WB11 to WB1M, WB21 to WB2M, . . . WBK1 to WBKM for each of the fibers, so as to drop the drop wavelength to a predetermined (arbitrary) receiver out of a plurality of receivers (routers) PI in an electric layer EL disposed with a router etc., for signal conversion between electric signals and wavelength-based optical signals; and an add-side optical signal terminating apparatus 10a adding an optical signal added from a predetermined (arbitrary) transmitter out of a plurality of transmitters PO in the electric layer EL, i.e., an add wavelength, to a predetermined wavelength group in need thereof and further adding the predetermined wavelength group to a predetermined wavelength division multiplexing signal in need thereof such that the predetermined wavelength group is transmitted from any of the output-side optical fibers Fo1, Fo2, . . . FoK transmitting the predetermined wavelength division multiplexing signal.

The drop-side optical signal terminating apparatus 10d and the add-side optical signal terminating apparatus 10a are made up of optical components having a reversible property in both directions of input/output in the same way as each other except that a direction of light is different. For example, even when those referred to as a demultiplexer on one side are referred to as a multiplexer on the other side, these optical components have the same configuration. Therefore, in the following description, a configuration of the add-side optical signal terminating apparatus 10a will not be described because a configuration of the drop-side optical signal terminating apparatus 10d will be described instead.

The drop-side optical signal terminating apparatus 10d includes K1×MN wavelength demultiplexers AWG(1) to AWG(k) respectively outputting K sets of MN wavelength-based optical signals respectively transmitted via the K input-side optical fibers Fi1, Fi2, . . . FiK connected to the input-side of the optical path cross-connect apparatus OXC; and a spatial switching apparatus KSS distributing a total wavelength channel number KMN of optical signals input from the K 1×MN wavelength demultiplexers AWG(1) to AWG(k) to a total number zKMN of the desired receivers (routers) PI of the electric layer. An add/drop rate to the electric layer EL of the node RN is denoted by z, which is a numerical value equal to or less than one.

The optical branching apparatus 12d is made up of K 1×2 optical couplers disposed on the input-side optical fibers Fi1, Fi2, . . . FiK. A branching function of the optical couplers may be achieved by WSSs (wavelength selective switches) or VBFs (variable wavelength filters). For example, optical amplifiers OA made up of optical fiber amplifiers or semiconductor optical amplifiers SOA may be disposed on an input side or an output side of the optical branching apparatus 12d.

Figure 5:
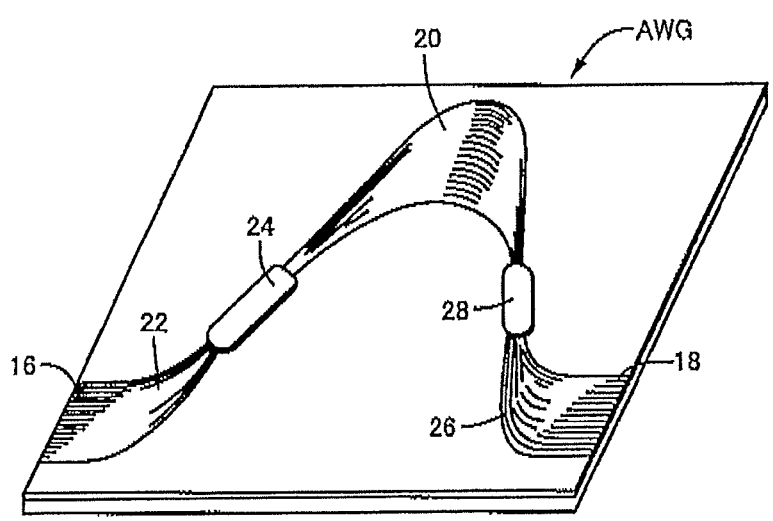
FIG. 5 is a diagram for explaining a configuration and a function of AWG used in the node RN of FIG. 1.

The wavelength demultiplexers AWG(1) to AWG(k) are made up of arrayed waveguide gratings AWG depicted in FIG. 5 on a substrate, for example. The arrayed waveguide gratings AWG includes a plurality of arrayed waveguides 20 having a difference in optical path length from each other; a plurality of input-side waveguides 22 having respective input ports 16; an input lens waveguide 24 disposed between the input-side waveguides 22 and the arrayed waveguides 20 and distributing the wavelength division multiplexing lights WDM input to the input ports 16 in a diffused manner such that the wavelength division multiplexing lights WDM are input to respective input-side end portions of a plurality of the arrayed waveguides 20; a plurality of output-side waveguides 26 respectively connected to optical connecting channels 18; and an output lens waveguide 28 disposed between the output-side waveguides 26 and the arrayed waveguides 20 and individually dispersing a plurality of wavelength channels included in the wavelength division multiplexing lights WDM output from the output-side end portions of a plurality of the arrayed waveguides 20 (e.g., a plurality of optical signals having wavelengths with center wavelength positions different from each other differentiated by 100 GHz) on the basis of a wavelength through diffraction based on a mutual difference in optical path length of a plurality of the arrayed waveguides 20 and collecting the wavelength channels to end portions of the output-side waveguides 26 so that the wavelength channels are demultiplexed to the respective preset output-side waveguides 26 to multiplex and output the lights collected to an end portion of each of the output-side waveguides 26 through different demultiplexing.

Figure 6:
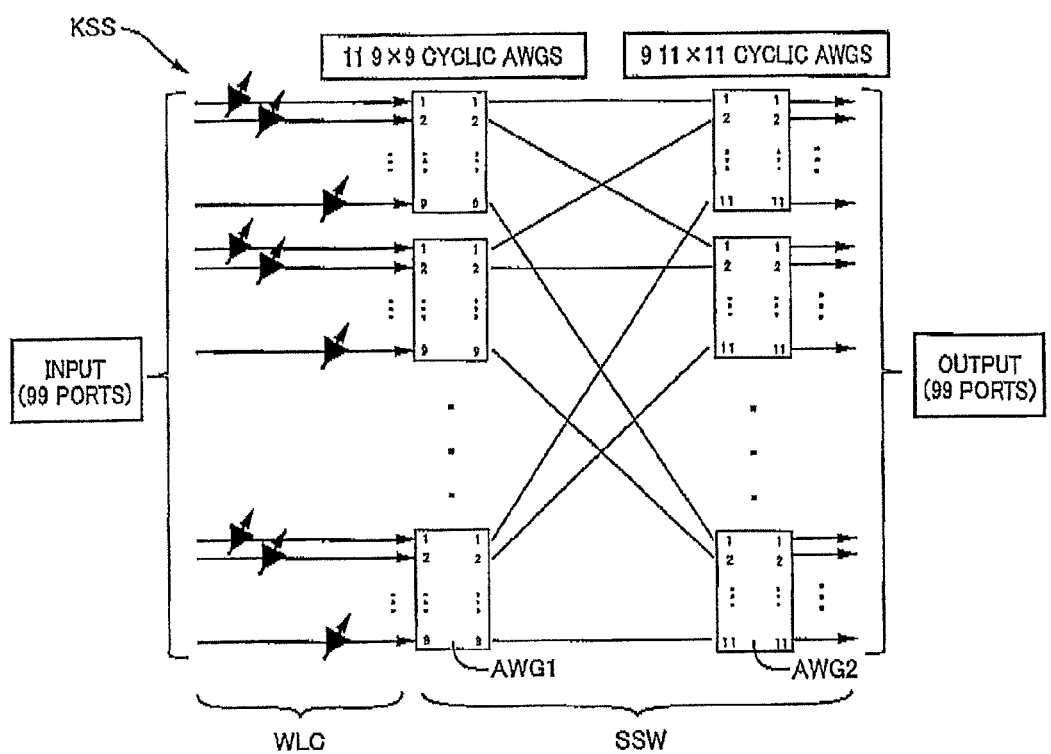
FIG. 6 is a diagram for explaining an example of a spatial switching apparatus KSS of an embodiment (first embodiment) in the present invention used in the node RN of FIG. 1.

The spatial switching apparatus KSS is configured as depicted in FIG. 6, for example. In FIG. 6, the spatial switching apparatus KSS has a signal wavelength converting portion WLC converting an optical signal of a single wavelength demultiplexed by the wavelength demultiplexers AWG(1) to AWG(k) of FIG. 1 into an optical signal of an arbitrary wavelength; a plurality of first cyclic AWGs 1 performing output from an output port corresponding to a wavelength of an input signal input from the signal wavelength converting portion WLC; and second cyclic AWGs 2 having the same total number of input ports as the total number of the output ports of the plurality of the first cyclic AWGs 1, and includes a spatial switching portion SSW performing routing of an optical signal of a single wavelength input from the signal wavelength converting portion WLC for output from an output port corresponding to the wavelength of the input signal out of the output ports of the second cyclic AWGs 2, FIGS. 7 and 8 are diagrams for explaining the signal wavelength converting portion WLC of the spatial switching apparatus KSS of FIG. 6 and a configuration and operation of the signal wavelength converting portion WLC.

Figure 7:
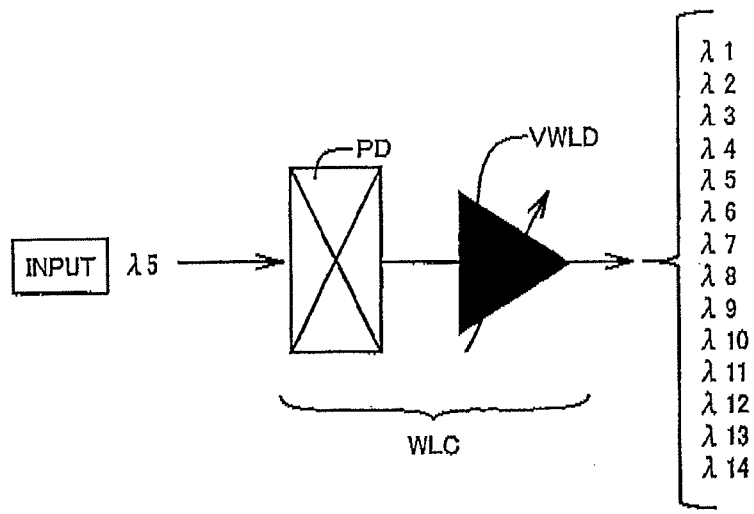
FIG. 7 is a diagram for explaining a configuration of a signal wavelength converting portion WLC included in the spatial switching apparatus KSS in the node RN of FIG. 1.

FIG. 7 is a diagram for explaining the signal wavelength converting portion WLC in detail. The signal wavelength converting portion WLC is made up of photodiode PD that is an electric signal converting element converting optical signals of single wavelengths respectively demultiplexed by the wavelength demultiplexers AWG(1) to AWG(k) into respective electric signals, and a variable wavelength laser VWLD serially connected to the diode PD and converting the electric signals into respective optical signals of arbitrary wavelengths based on the electric signals from the diode PD. For example, the variable wavelength laser VWLD may be a system of changing a resonance length by utilizing the MEMS technique to change an output wavelength, a system having a wavelength selecting element such as a prism and a diffraction grating inserted in an optical resonator and moving the wavelength selecting element, or a system of adjusting a temperature of a laser diode by utilizing a heat ray to change a wavelength. FIG. 7 depicts that, for example, if a signal of a wavelength $\lambda 5$ is input, a signal of an arbitrary wavelength having any of wavelengths $\lambda 1$ to $\lambda 14$ is output.

Figure 8:
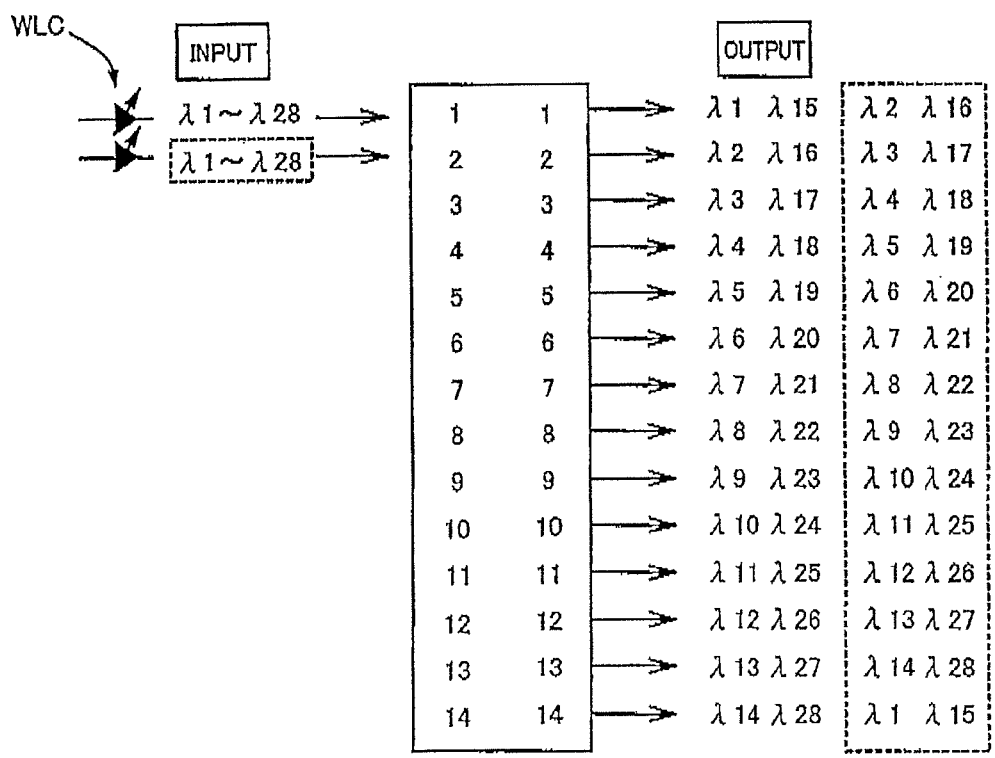
FIG. 8 is a diagram for explaining a cyclic AWGSSN included in the spatial switching apparatus KSS in the node RN of FIG. 1.

FIG. 8 is a diagram for explaining the operation of the first cyclic AWG 1 by using a 14×14 cyclic AWG connected to the signal wavelength converting portion WLC. FIG. 8 depicts that when optical signals having any of 28 wavelengths of wavelengths $\lambda 1$ to $\lambda 28$ are selectively output from a first signal wavelength converting portion WLC to a first input port of the 14×14 cyclic AWG, optical signals of 14 wavelengths of wavelengths $\lambda 1$ to $\lambda 14$ and optical signals of 14 wavelengths of wavelengths $\lambda 14$ to $\lambda 28$ are output in parallel from output ports 1 to 14 of the 14×14 cyclic AWG. It is also depicted that when optical signals of 28 wavelengths of wavelengths $\lambda 16$ to $\lambda 28$ are selectively output from a second signal wavelength converting portion WLC to a second input port of the 14×14 cyclic AWG, optical signals of 14 wavelengths of wavelengths $\lambda 2$ to $\lambda 14$ and $\lambda 1$ and optical signals of 14 wavelengths of wavelengths $\lambda 16$ to $\lambda 28$ and $\lambda 15$ are output in parallel from the output ports 1 to 14 of the 14×14 cyclic AWG. As described above, it is depicted that a conversion of a wavelength of an input signal enables the input signal to be output from a desired output port. The spatial switching portion SSW of FIG. 6 has 11 9×9 cyclic AWGs used as the first cyclic AWGs 1 and 9 11×11 cyclic AWGs used as the second cyclic AWGs 2. The output ports 1 to 9 of the 1st first cyclic AWG 1 are respectively connected to the input ports 1 of the 1st to 9th second cyclic AWGs 2; the output ports 1 to 9 of the 2nd first cyclic AWG 1 are respectively connected to the input ports 2 of the 1st to 9th second cyclic AWGs 2; and the subsequent connections are made in the same way. The spatial switching portion SSW of FIG. 6 can convert a wavelength of an input signal to the first cyclic AWGs 1 to output the input signal from a desired output port of the output ports of the second cyclic AWGs 2.

According to the optical signal terminating apparatus 10 of this embodiment, since the spatial switching portion SSW is made up of pluralities of the first cyclic AWGs 1 and the second cyclic AWGs 2 of small scales having relatively high performance in terms of a deviation of a center frequency, the large-scale spatial switching apparatus KSS can be acquired that has a routing function equivalent to the case of using a large-scale cyclic AWG and that has characteristic preventing a deviation of a center frequency of a demultiplexed or multiplexed wavelength.

FIG. 9 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 9 depicts an example when the first cyclic AWGs 1 and the second cyclic AWGs 2 are configured in two stages with the respective numbers of the input/output ports having a relatively prime relationship.

Second Embodiment

Figure 10:
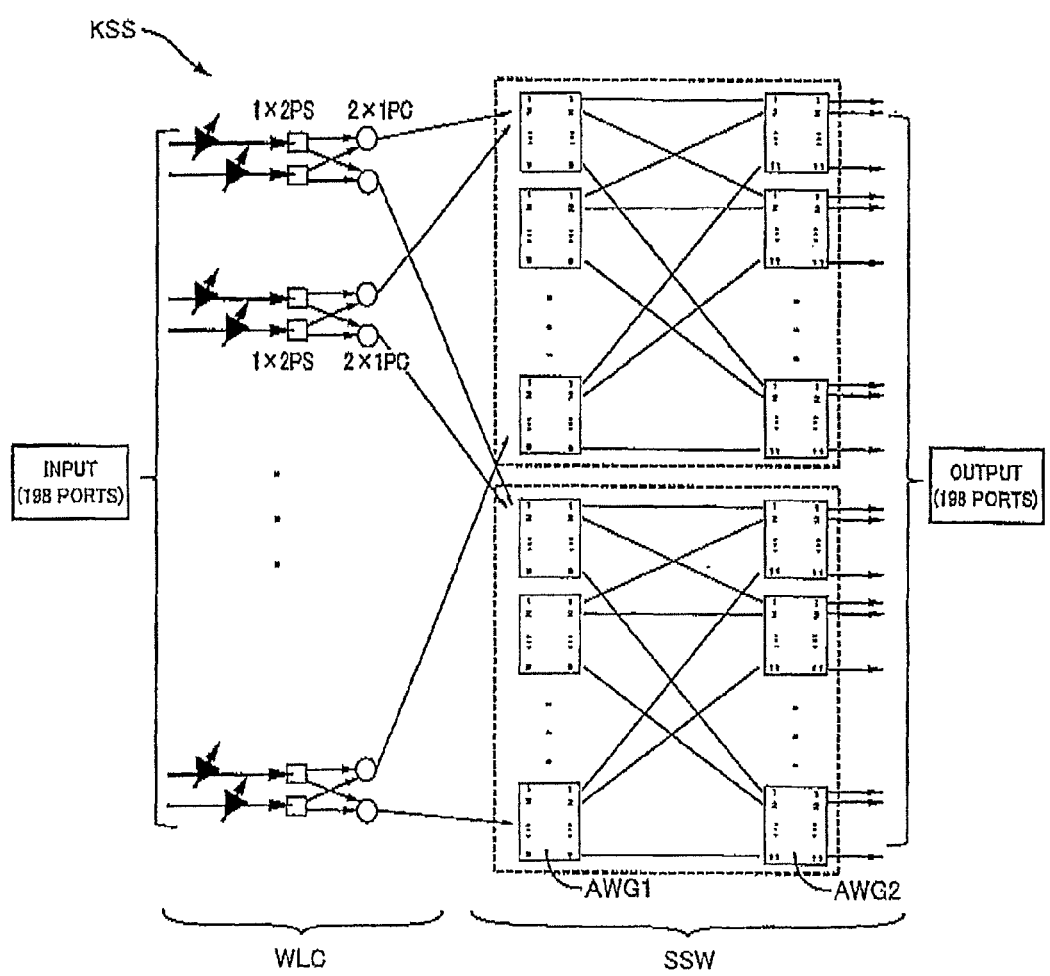
FIG. 10 is a diagram for explaining a spatial switching apparatus KSS of another embodiment (second embodiment) in the present invention and corresponds to FIG. 6.

FIG. 10 is the same as the embodiment of FIG. 6 except that two spatial switching portions SSW having a total of 198 (twofold) output ports are included, that the signal wavelength converting portion WLC is made up of 198 (twofold) photodiodes PD and 198 (twofold) variable wavelength lasers VWLD serially connected to the diodes PD and converting electric signals into respective optical signals of arbitrary wavelengths having the same meanings based on the electric signals from the diodes PD, and that 1×2 optical switches PS and 2×1 optical couplers PC serially connected to the variable wavelength lasers VWLD are disposed.

In this embodiment, 99 pairs of the variable wavelength lasers VWLD are disposed and an output of a pair of the variable wavelength lasers VWLD is supplied via the 1×2 optical switches PS and the 2×1 optical couplers PC selectively to the two spatial switching portions SSW. According to the optical signal terminating apparatus 10 of this embodiment, as is the case with the embodiments, since the spatial switching portion SSW is made up of pluralities of the first cyclic AWGs 1 and the second cyclic AWGs 2 of small scales having relatively high performance in terms of a deviation of a center frequency, the large-scale spatial switching apparatus KSS can be acquired that has a routing function equivalent to the case of using a large-scale cyclic AWG and that has characteristics making a deviation of a center frequency of a demultiplexed or multiplexed wavelength smaller. Additionally, the scale of the spatial switching portions SSW is increased twice.

Third Embodiment

Figure 11:
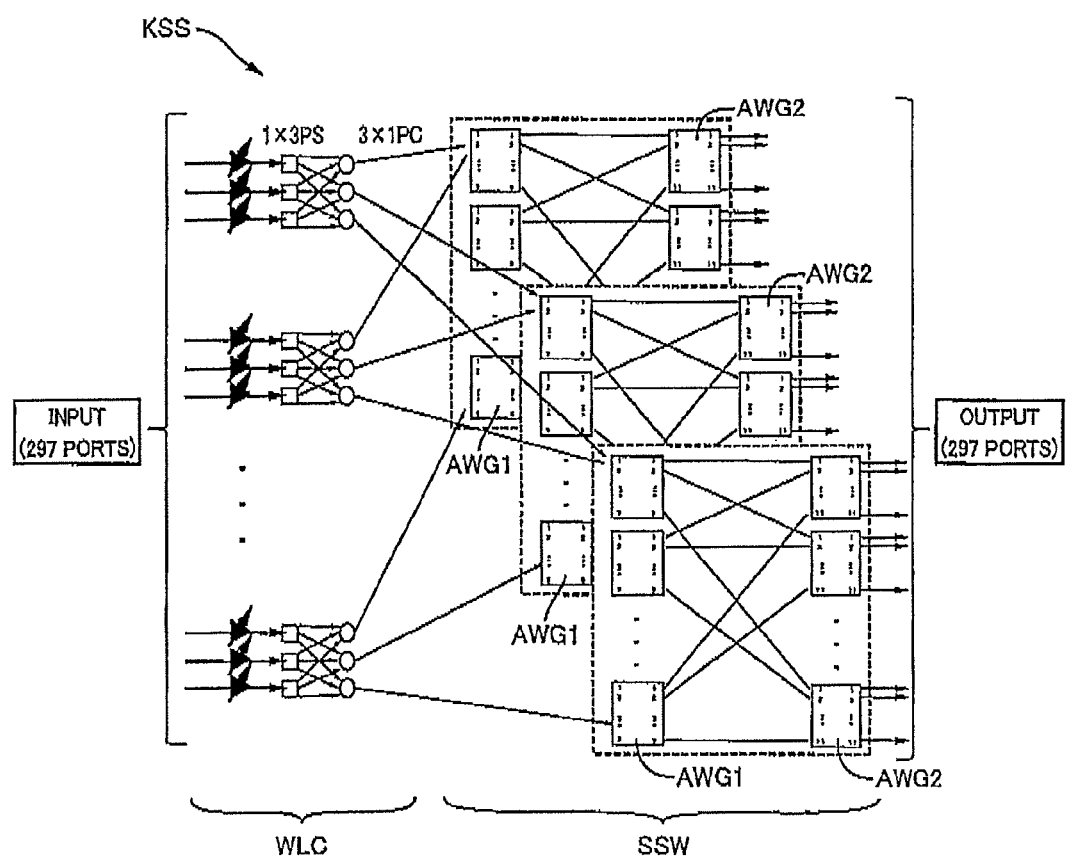
FIG. 11 is a diagram for explaining a spatial switching apparatus KSS of another embodiment (third embodiment) in the present invention and corresponds to FIG. 6.

FIG. 11 is the same as the embodiment of FIG. 6 except that three spatial switching portions SSW having a total of 297 (threefold) output ports are included, that the signal wavelength converting portion WLC is made up of 297 (threefold) photodiodes PD and 297 (threefold) variable wavelength lasers VWLD serially connected to the diodes PD and converting electric signals into respective optical signals of arbitrary wavelengths having the same meanings based on the electric signals from the diodes PD, and that 1×3 optical switches PS and 3×1 optical couplers PC serially connected to the variable wavelength lasers VWLD are disposed.

In this embodiment, 99 sets of the three variable wavelength lasers VWLD are disposed and an output of a set of the variable wavelength lasers VWLD is supplied via the 1×3 optical switches PS and the 3×1 optical couplers PC selectively to the three spatial switching portions SSW. According to the optical signal terminating apparatus 10 of this embodiment, as is the case with the embodiment, since the spatial switching portion SSW is made up of pluralities of the first cyclic AWGs 1 and the second cyclic AWGs 2 of small scales having relatively high performance in terms of a deviation of a center frequency, the large-scale spatial switching apparatus KSS can be acquired that has a routing function equivalent to the case of using a large-scale cyclic AWG and that has characteristics making a deviation of a center frequency of a demultiplexed or multiplexed wavelength smaller. Additionally, the scale of the spatial switching portions SSW is increased three times.

Fourth Embodiment

Figure 12:
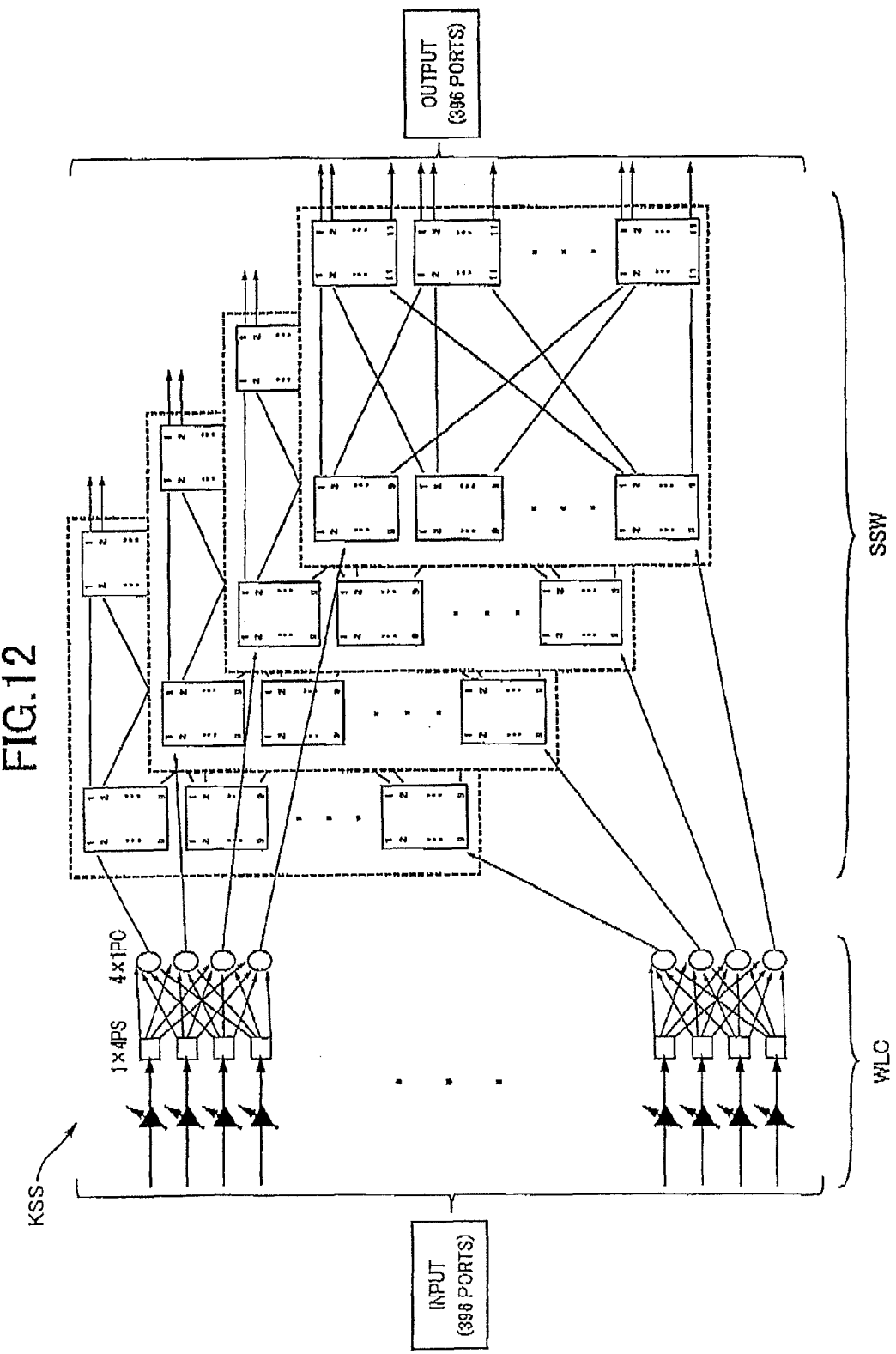
FIG. 12 is a diagram for explaining a spatial switching apparatus KSS of another embodiment (fourth embodiment) in the present invention and corresponds to FIG. 6.

FIG. 12 is the same as the embodiment of FIG. 6 except that two spatial switching portions SSW having a total of 396 (fourfold) output ports are included, that the signal wavelength converting portion WLC is made up of 396 (fourfold) photodiodes PD and 396 (fourfold) variable wavelength lasers VWLD serially connected to the diodes PD and converting electric signals into respective optical signals of arbitrary wavelengths having the same meanings based on the electric signals from the diodes PD, and that 1×4 optical switches PS and 4×1 optical couplers PC serially connected to the variable wavelength lasers VWLD are disposed.

In this embodiment, 99 sets of the four variable wavelength lasers VWLD are disposed and an output of a set of the variable wavelength lasers VWLD is supplied via the 1×4 optical switches PS and the 4×1 optical couplers PC selectively to the four spatial switching portions SSW. According to the optical signal terminating apparatus 10 of this embodiment, as is the case with the embodiments, since the spatial switching portion SSW is made up of pluralities of the first cyclic AWGs 1 and the second cyclic AWGs 2 of small scales having relatively high performance in terms of a deviation of a center frequency, the large-scale spatial switching apparatus KSS can be acquired that has a routing function equivalent to the case of using a large-scale cyclic AWG and that has characteristics making a deviation of a center frequency of a demultiplexed or multiplexed wavelength smaller. Additionally, the scale of the spatial switching portions SSW is increased four times.

Fifth Embodiment

Figure 13:
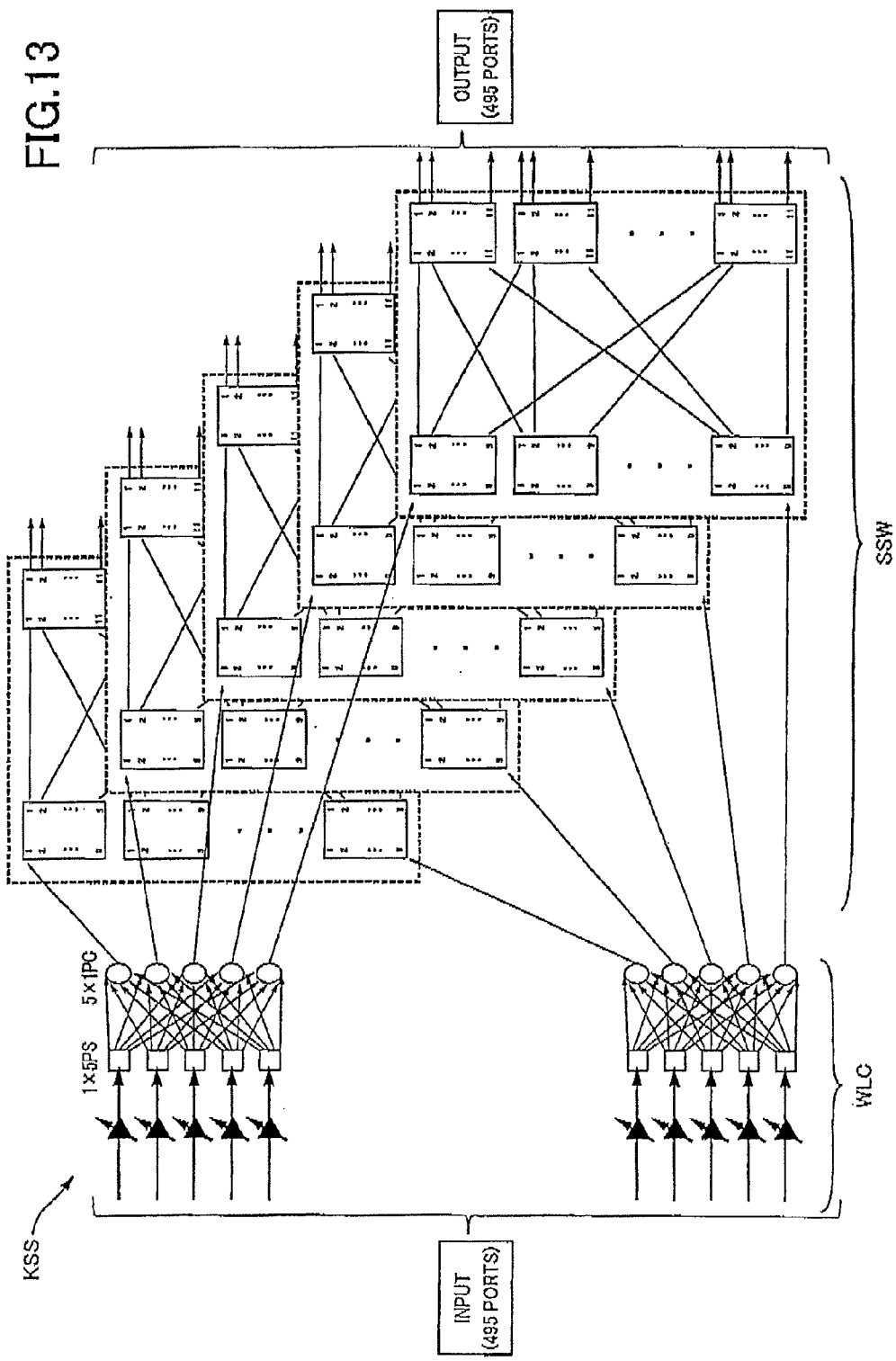
FIG. 13 is a diagram for explaining a spatial switching apparatus KSS of another embodiment (fifth embodiment) in the present invention and corresponds to FIG. 6.

FIG. 13 is the same as the embodiment of FIG. 6 except that two spatial switching portions SSW having a total of 495 (fivefold) output ports are included, that the signal wavelength converting portion WLC is made up of 495 (fivefold) photodiodes PD and 495 (fivefold) variable wavelength lasers VWLD serially connected to the diodes PD and converting electric signals into respective optical signals of arbitrary wavelengths having the same meanings based on the electric signals from the diodes PD, and that 1×5 optical switches PS and 5×1 optical couplers PC serially connected to the variable wavelength lasers VWLD are disposed.

In this embodiment, 99 sets of the five variable wavelength lasers VWLD are disposed and an output of a set of the variable wavelength lasers VWLD is supplied via the 1×5 optical switches PS and the 5×1 optical couplers PC selectively to the five spatial switching portions SSW. According to the optical signal terminating apparatus 10 of this embodiment, as is the case with the embodiments, since the spatial switching portion SSW is made up of pluralities of the first cyclic AWGs 1 and the second cyclic AWGs 2 of small scales having relatively high performance in terms of a deviation of a center frequency, the large-scale spatial switching apparatus KSS can be acquired that has a routing function equivalent to the case of using a large-scale cyclic AWG and that has characteristics making a deviation of a center frequency of a demultiplexed or multiplexed wavelength smaller. Additionally, the scale of the spatial switching portions SSW is increased five times.

Sixth Embodiment

Figure 14:
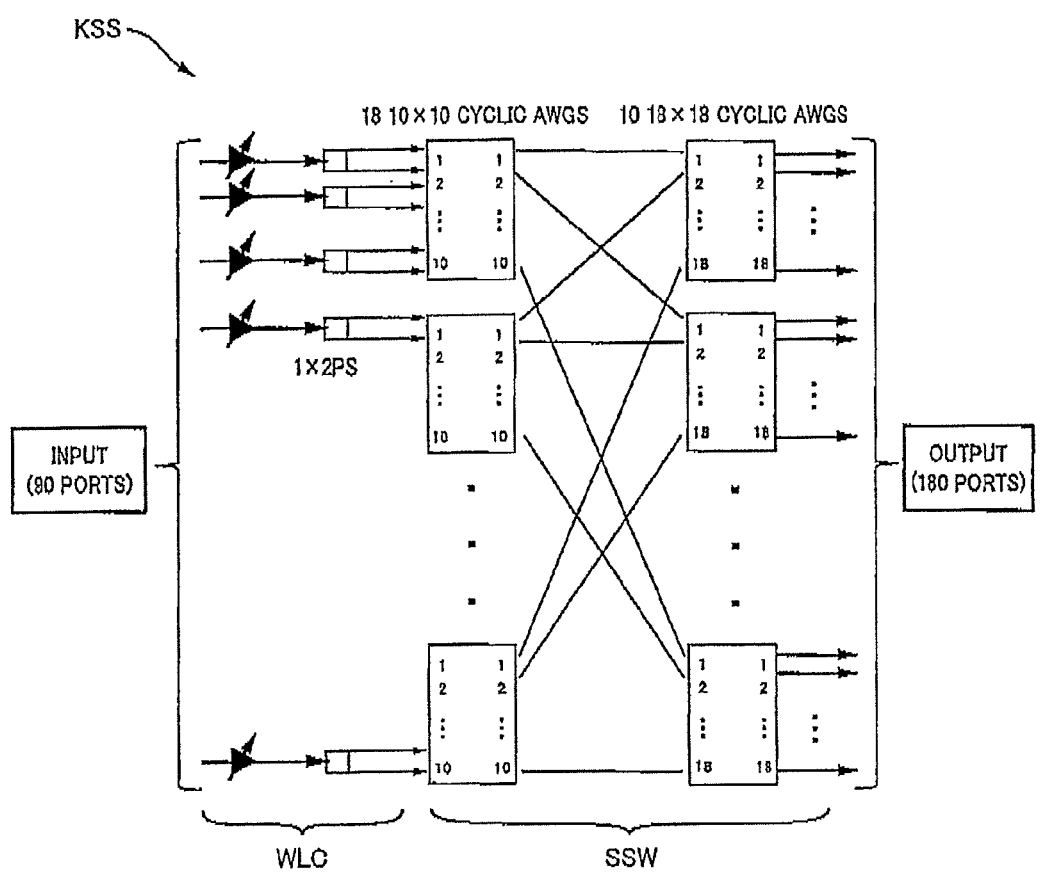
FIG. 14 is a diagram for explaining a spatial switching apparatus KSS of another embodiment (sixth embodiment) in the present invention and corresponds to FIG. 6.

FIG. 14 is the same as the embodiment of FIG. 6 except that the spatial switching portion SSW includes the first cyclic AWGs 1 made up of 10×10 cyclic AWGs and the second cyclic AWGs 2 made up of 18×18 cyclic AWGs, and that the signal wavelength converting portion WLC is disposed with the 1×2 optical switches PS serially connected to 90 variable wavelength lasers VWLD to occupy a pair of input ports of the first cyclic AWGs 1 with output of a pair of the 1×2 optical switches PS.

In this embodiment, the 90 variable wavelength lasers VWLD are disposed and an output of one variable wavelength laser VWLD is supplied via the 1×2 optical switch PS selectively to a pair of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "2"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 15, 16:
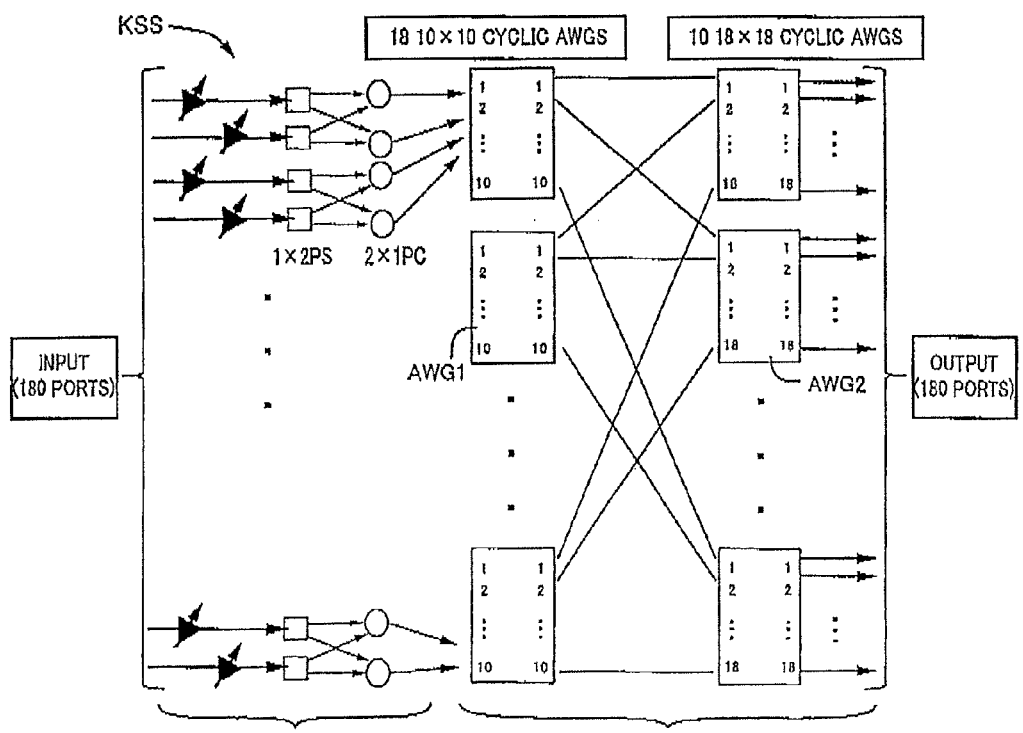
FIG. 15 depicts an example of input/output scales employable for the first switching apparatus AWG 1 and the second switching apparatus AWG 2 making up the spatial switching portion SSW used in the embodiment of FIG. 14 and an example of the number of routable wavelengths in combinations thereof.
FIG. 16 is a diagram for explaining a spatial switching apparatus KSS of another embodiment (seventh embodiment) in the present invention and corresponds to FIG. 6.

FIG. 15 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "2" and the 1×2 optical switches PS are used.

Seventh Embodiment

FIG. 16 is the same as the embodiment of FIG. 14 except that the signal wavelength converting portion WLC has 180 (twofold) variable wavelength lasers VWLD and is disposed with 1×2 optical switches PS and 2×1 optical couplers PC serially connected to the variable wavelength lasers VWLD.

In this embodiment, the 180 variable wavelength lasers VWLD are disposed and an output of a pair of variable wavelength lasers VWLD is supplied via the 1×2 optical switch PS and 2×1 optical couplers PC selectively to preset input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "2"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller. Since the number of processable inputs is doubled although the scale of spatial switching portion SSW is the same, efficiency is increased.

Figures 17, 18:
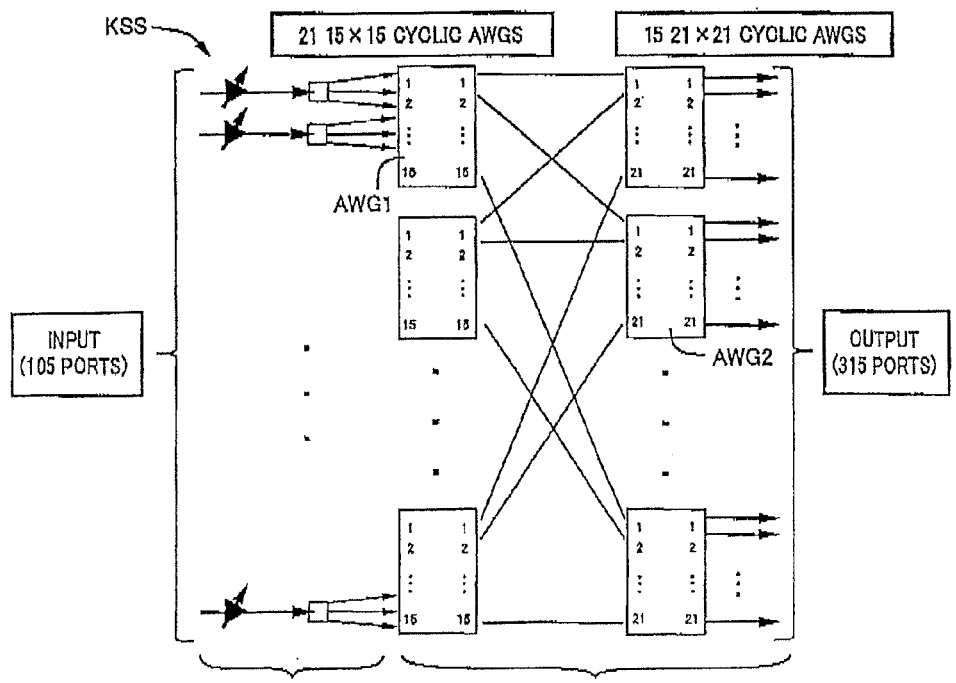
FIG. 17 depicts an example of input/output scales employable for the first switching apparatus AWG 1 and the second switching apparatus AWG 2 making up the spatial switching portion SSW used in the embodiment of FIG. 16 and an example of the number of routable wavelengths in combinations thereof.
FIG. 18 is a diagram for explaining a spatial switching apparatus KSS of another embodiment (eighth embodiment) in the present invention and corresponds to FIG. 6.

FIG. 17 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "2" and the 1×2 optical switches PS and 2×1 optical couplers PC are used.

Eighth Embodiment

FIG. 18 is the same as the embodiment of FIG. 14 except that the respective numbers of the input/output ports of the first cyclic AWGs 1 and the second cyclic AWGs 2 have a common factor "3" and that the signal wavelength converting portion WLC has 105 variable wavelength lasers VWLD and is disposed with 1×3 optical switches PS serially connected to the variable wavelength lasers VWLD.

In this embodiment, the 105 variable wavelength lasers VWLD are disposed and an output of the variable wavelength laser VWLD is supplied via the 1×3 optical switch PS selectively to each of the three input ports out of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "3"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 19, 20:
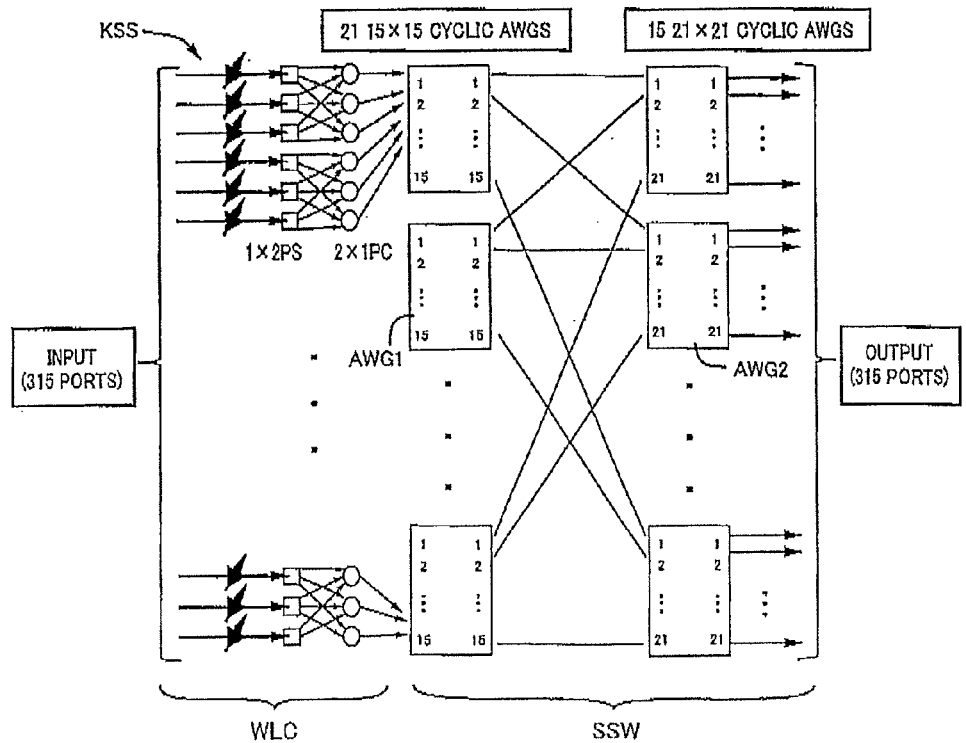
FIG. 19 depicts an example of input/output scales employable for the first switching apparatus AWG 1 and the second switching apparatus AWG 2 making up the spatial switching portion SSW used in the embodiment of FIG. 18 and an example of the number of routable wavelengths in combinations thereof.
FIG. 20 is a diagram for explaining a spatial switching apparatus KSS of another embodiment (ninth embodiment) in the present invention and corresponds to FIG. 6.

FIG. 19 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "3" and the 1×3 optical switches PS are used.

Ninth Embodiment

FIG. 20 is the same as the embodiment of FIG. 14 except that the respective numbers of the input/output ports of the first cyclic AWGs 1 and the second cyclic AWGs 2 have a common factor "3" and that the signal wavelength converting portion WLC has 315 variable wavelength lasers VWLD and is disposed with 1×3 optical switches PS and 3×1 optical couplers PC serially connected to the variable wavelength lasers VWLD.

In this embodiment, the 315 variable wavelength lasers VWLD are disposed and three outputs of the variable wavelength laser VWLD is supplied via the 1×3 optical switch PS and 3×1 optical couplers PC selectively to one input port out of a pair of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "3"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 21, 22:
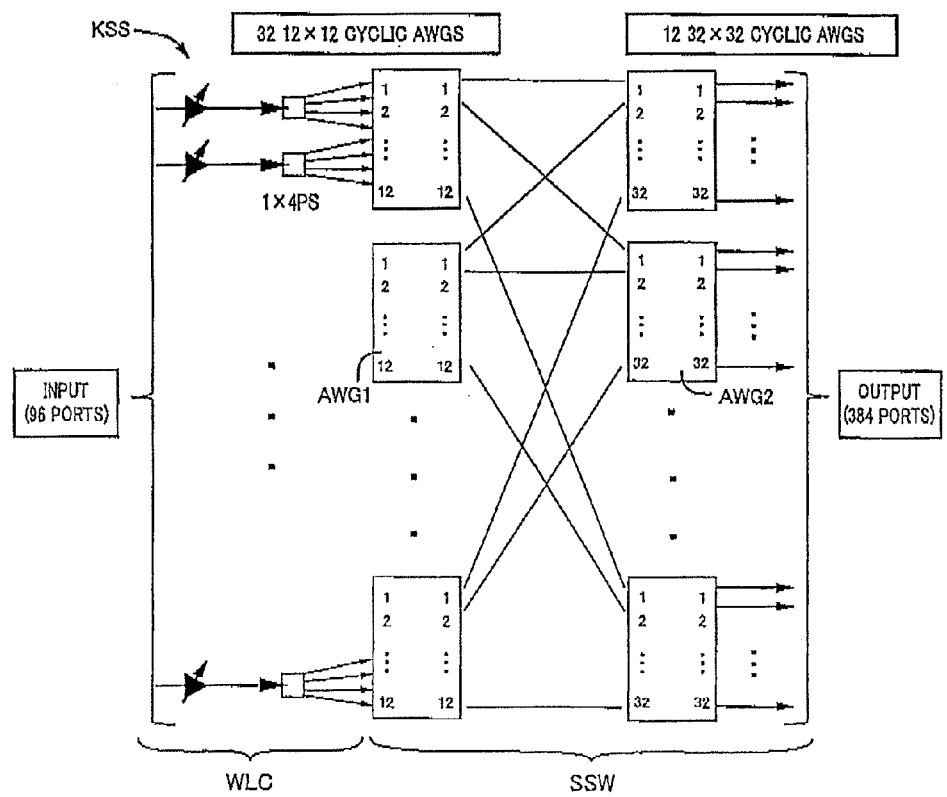
FIG. 21 depicts an example of input/output scales employable for the first switching apparatus AWG 1 and the second switching apparatus AWG 2 making up the spatial switching portion SSW used in the embodiment of FIG. 20 and an example of the number of routable wavelengths in combinations thereof.
FIG. 22 is a diagram for explaining a spatial switching apparatus KSS of another embodiment (tenth embodiment) in the present invention and corresponds to FIG. 6.

FIG. 21 depicts an example of input/output scales employable for the first cyclic AWGs 1 and the second cyclic AWGs 2 making up the spatial switching portion SSW of this embodiment and an example of the number of mutable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "3" and the 1×3 optical switches PS and 3×1 optical couplers PC are used.

Tenth Embodiment

FIG. 22 is the same as the embodiment of FIG. 14 except that the respective numbers of the input/output ports of the first cyclic AWGs 1 and the second cyclic AWGs 2 have a common factor "4" and that the signal wavelength converting portion WLC has 96 variable wavelength lasers VWLD and is disposed with 1×4 optical switches PS serially connected to the variable wavelength lasers VWLD.

In this embodiment, the 96 variable wavelength lasers VWLD are disposed and an output of the variable wavelength laser VWLD is supplied via the 1×3 optical switch PS selectively to each of the four input ports out of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "4"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 23, 24:
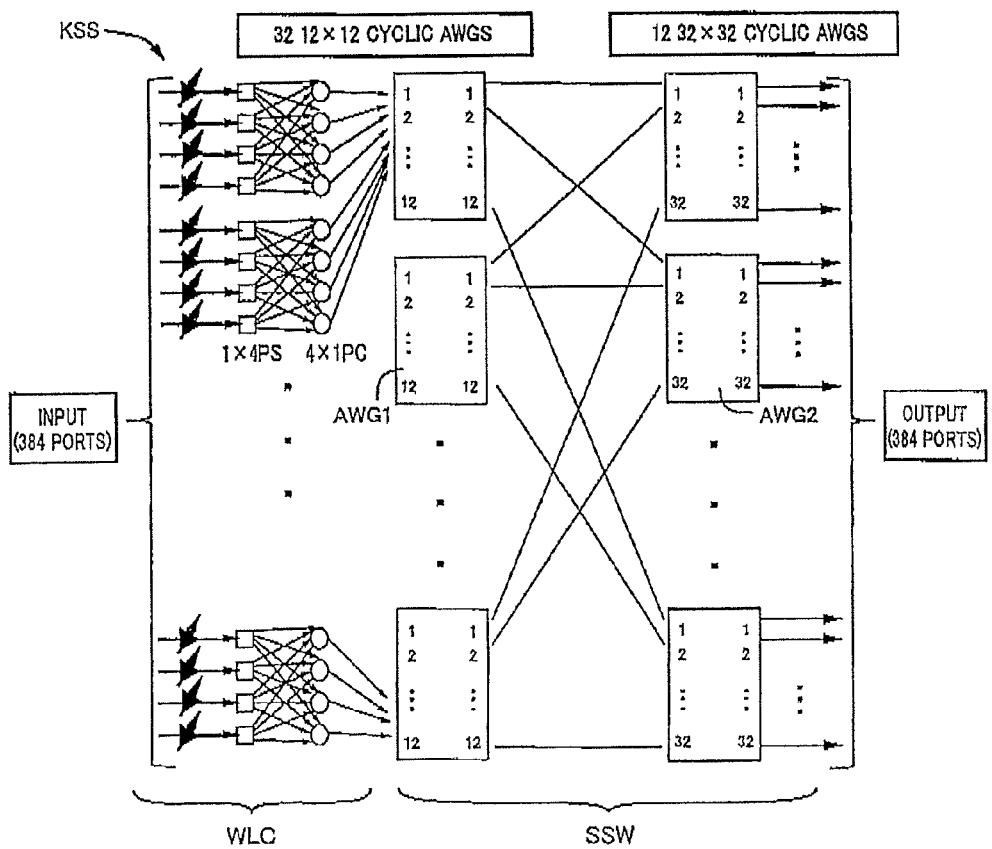
FIG. 23 depicts an example of input/output scales employable for the first switching apparatus AWG 1 and the second switching apparatus AWG 2 making up the spatial switching portion SSW used in the embodiment of FIG. 22 and an example of the number of routable wavelengths in combinations thereof.
FIG. 24 is a diagram for explaining a spatial switching apparatus KSS of another embodiment (eleventh embodiment) in the present invention and corresponds to FIG. 6.

FIG. 23 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "4" and the 1×4 optical switches PS are used.

Eleventh Embodiment

FIG. 24 is the same as the embodiment of FIG. 14 except that the respective numbers of the input/output ports of the first cyclic AWGs 1 and the second cyclic AWGs 2 have a common factor "4" and that the signal wavelength converting portion WLC has 384 variable wavelength lasers VWLD and is disposed with 1×4 optical switches PS and 4×1 optical couplers PC serially connected to the variable wavelength lasers VWLD.

In this embodiment, the 384 variable wavelength lasers VWLD are disposed and four outputs of the variable wavelength laser VWLD is supplied via the 1×4 optical switch PS and 4×1 optical couplers PC selectively to one input port out of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "4"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 25, 26:
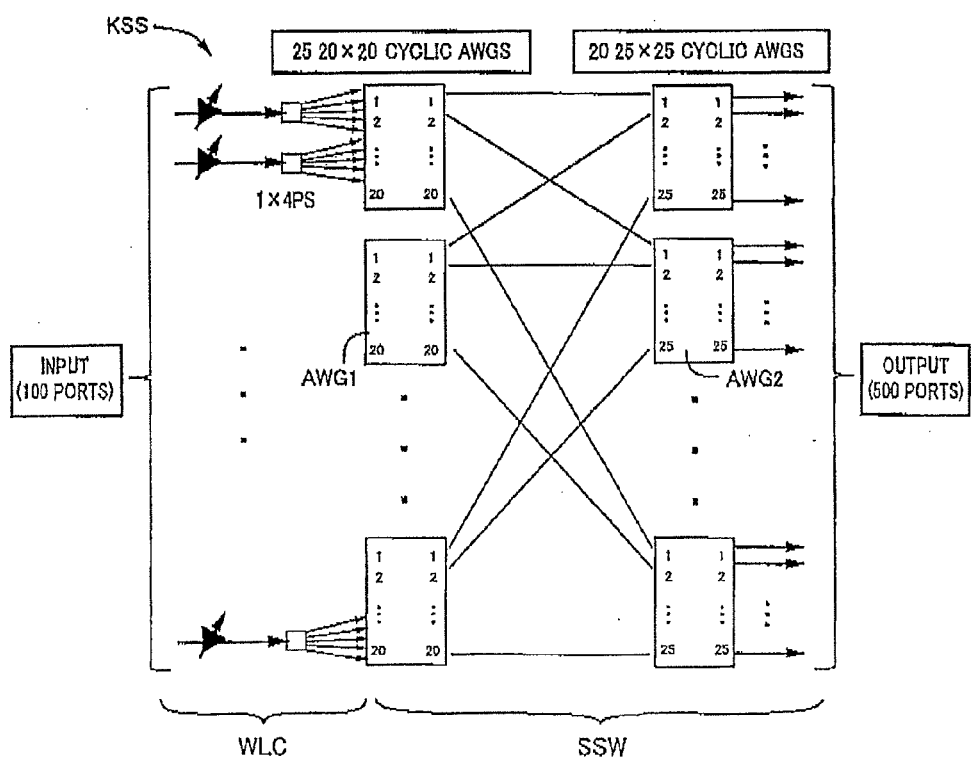
FIG. 25 depicts an example of input/output scales employable for the first switching apparatus AWG 1 and the second switching apparatus AWG 2 making up the spatial switching portion SSW used in the embodiment of FIG. 24 and an example of the number of routable wavelengths in combinations thereof.
FIG. 26 is a diagram for explaining a spatial switching apparatus KSS of another embodiment (twelfth embodiment) in the present invention and corresponds to FIG. 6.

FIG. 25 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "4" and the 1×4 optical switches PS and 4×1 optical couplers PC are used.

Twelfth Embodiment

FIG. 26 is the same as the embodiment of FIG. 14 except that the respective numbers of the input/output ports of the first cyclic AWGs 1 and the second cyclic AWGs 2 have a common factor "5" and that the signal wavelength converting portion WLC has 100 variable wavelength lasers VWLD and is disposed with 1×5 optical switches PS serially connected to the variable wavelength lasers VWLD.

In this embodiment, the 100 variable wavelength lasers VWLD are disposed and an output of the variable wavelength laser VWLD is supplied via the 1×5 optical switch PS selectively to each of the five input ports out of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "5"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 27, 28:
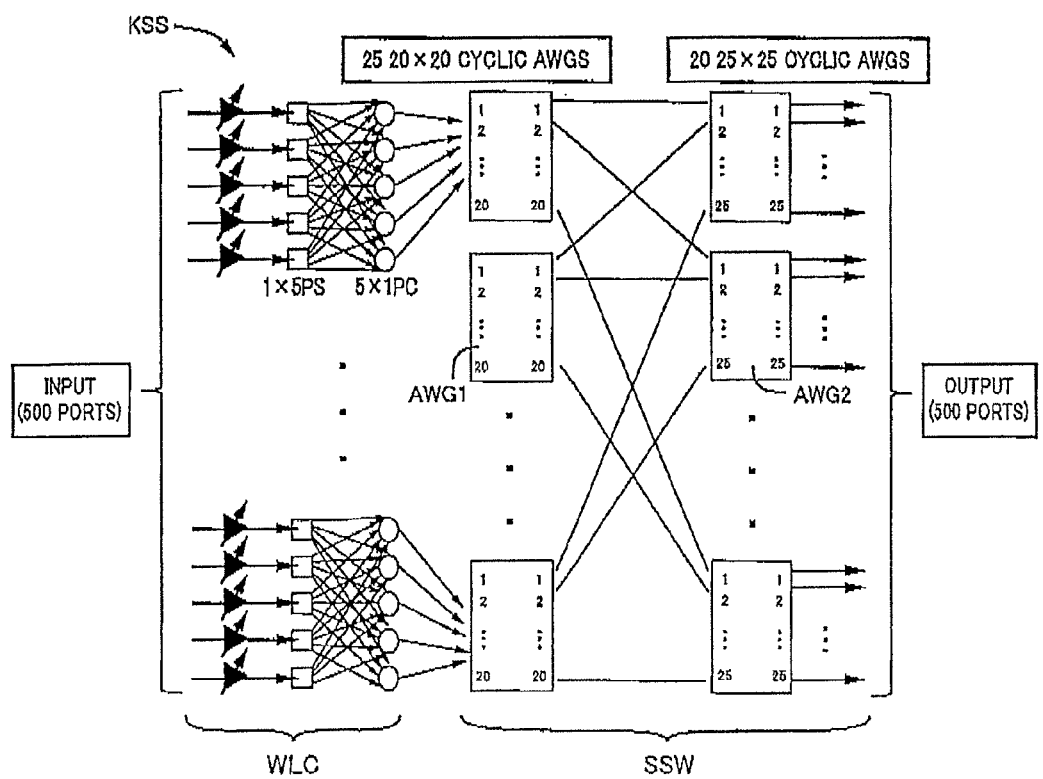
FIG. 27 depicts an example of input/output scales employable for the first switching apparatus AWG 1 and the second switching apparatus AWG 2 making up the spatial switching portion SSW used in the embodiment of FIG. 26 and an example of the number of routable wavelengths in combinations thereof.
FIG. 28 is a diagram for explaining a spatial switching apparatus KSS of another embodiment (thirteenth embodiment) in the present invention and corresponds to FIG. 6.

FIG. 27 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "5" and the 1×5 optical switches PS are used.

Thirteenth Embodiment

FIG. 28 is the same as the embodiment of FIG. 14 except that the respective numbers of the input/output ports of the first cyclic AWGs 1 and the second cyclic AWGs 2 have a common factor "5" and that the signal wavelength converting portion WLC has 500 variable wavelength lasers VWLD and is disposed with 1×5 optical switches PS and 5×1 optical couplers PC serially connected to the variable wavelength lasers VWLD.

In this embodiment, the 500 variable wavelength lasers VWLD are disposed and five outputs of the variable wavelength laser VWLD is supplied via the 1×5 optical switch PS and 5×1 optical couplers PC selectively to one input port out of input ports of the first cyclic AWG 1. According to the optical signal terminating apparatus 10 of this embodiment, the input/output numbers of the first cyclic AWGs 1 and the second cyclic AWGs 2 are in a mutual relationship of having a common factor "5"; however, since the spatial switching portion SSW is made up of pluralities of the first cyclic AWGs 1 and the second cyclic AWGs 2 of small scales having relatively high performance in terms of a deviation of a center frequency as is the case with the embodiments, the large-scale spatial switching apparatus KSS can be acquired that has a routing function equivalent to the case of using a large-scale cyclic AWG and that has characteristics making a deviation of a center frequency of a demultiplexed or multiplexed wavelength smaller.

Figures 29, 30:
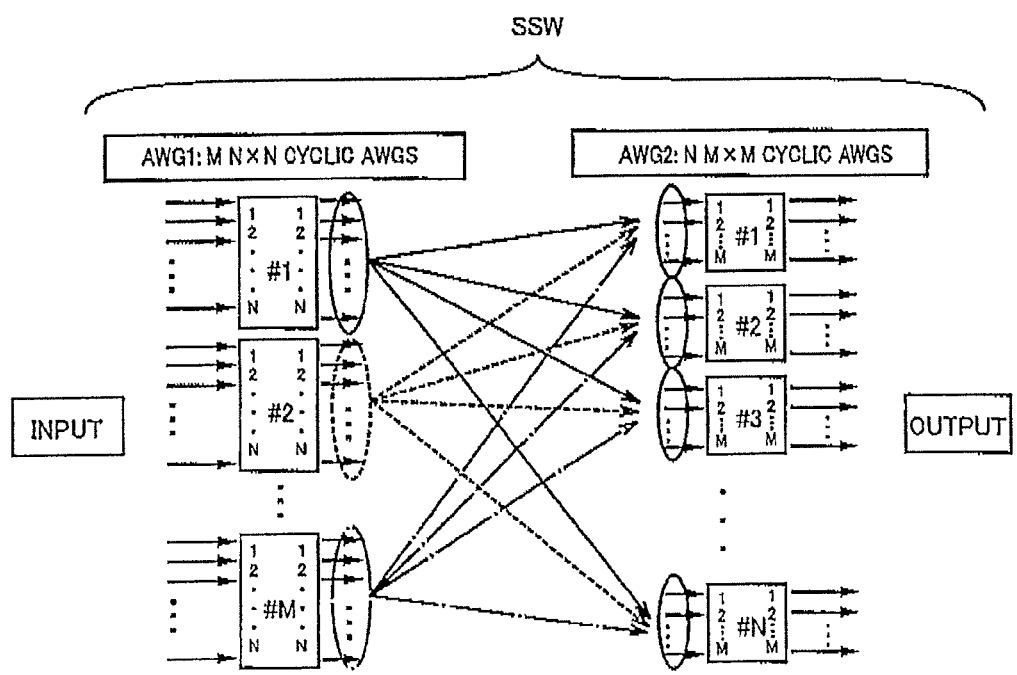
FIG. 29 depicts an example of input/output scales employable for the first switching apparatus AWG 1 and the second switching apparatus AWG 2 making up the spatial switching portion SSW used in the embodiment of FIG. 28 and an example of the number of routable wavelengths in combinations thereof.
FIG. 30 depicts interconnection of the M first cyclic AWGs 1 consisting of N×N cyclic AWGs and the N second cyclic AWGs 2 consisting of M×M cyclic AWGs.

FIG. 29 depicts an example of input/output scales employable for the first cyclic AWGs 1 and the second cyclic AWGs 2 making up the spatial switching portion SSW of this embodiment and an example of the number of routable wavelengths in combinations thereof. In other words, FIG. 15 depicts an example when the first cyclic AWGs 1 and the second cyclic AWGs 2 are configured in two stages with the respective numbers of the input/output ports in a mutual relationship of having a common factor "5" and the 1×5 optical switches PS and 5×1 optical couplers PC are used.

Fourteenth Embodiment

The wiring intersection number between the first cyclic AWGs 1 and the second cyclic AWGs 2 making up the spatial switching portion SSW will hereinafter be discussed. The discussion will be made because if the spatial switching portion SSW is implemented by a three-dimensional optical waveguide in a monolithic structure, the smaller wiring intersection number not only makes fabrication easier but also reduces a transmission loss of an optical signal.

FIG. 30 depicts interconnection of the M first cyclic AWGs 1 consisting of N×N cyclic AWGs and the N second cyclic AWGs 2 consisting of M×M cyclic AWGs. The arbitrary first cyclic AWGs 1 are all connected to the second cyclic AWGs 2 and a plurality of different output ports of the first cyclic AWGs 1 are not connected the same second cyclic AWGs 2.

Figure 31:
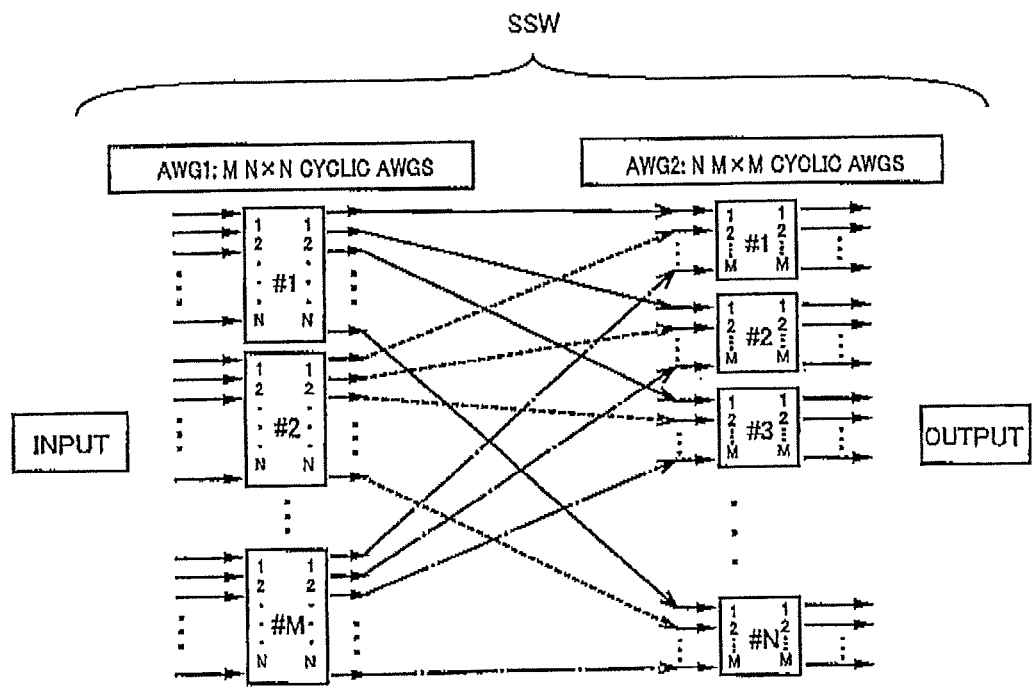
FIG. 31 depicts a configuration of the smallest wiring intersection number in a interconnection between the first cyclic AWGs 1 and the second cyclic AWGs 2 of FIG. 30.
Figure 32:
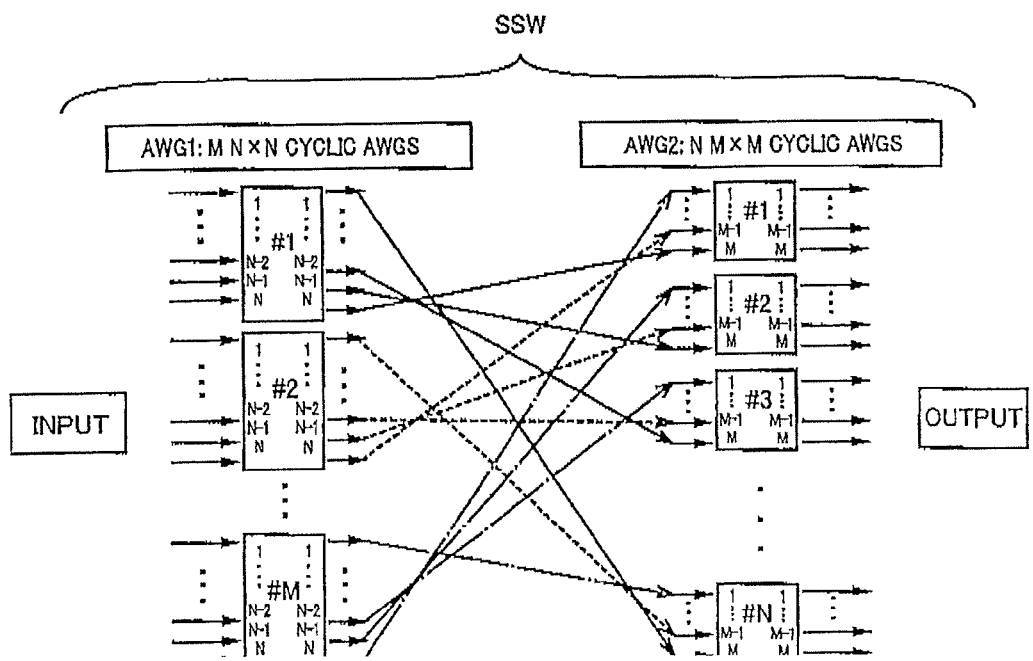
FIG. 32 depicts a configuration of the largest wiring intersection number in a interconnection between the first cyclic AWGs 1 and the second cyclic AWGs 2 of FIG. 30.

FIG. 31 depicts a configuration of the smallest wiring intersection number between the first cyclic AWGs 1 and the second cyclic AWGs 2 making up the spatial switching portion SSW. FIG. 32 depicts a configuration of the largest wiring intersection number between the first cyclic AWGs 1 and the second cyclic AWGs 2. A range of the wiring intersection number can be expressed from these facts by the following Equation (1). In FIG. 31 of the configuration of the smallest wiring intersection number, it is apparent that a number of an output port of the first cyclic AWG 1 is equal to a number of the second cyclic AWG 2 itself connected to the output port and that an output port number of the second cyclic AWG 2 is equal to a number of the first cyclic AWG 1 itself connected to the input port thereof.

$$(N-1)(M-1)NM/4 \leq \text{wiring intersection number} \leq (NM+N+M-3)NM/4 \quad (1)$$

Figure 33:
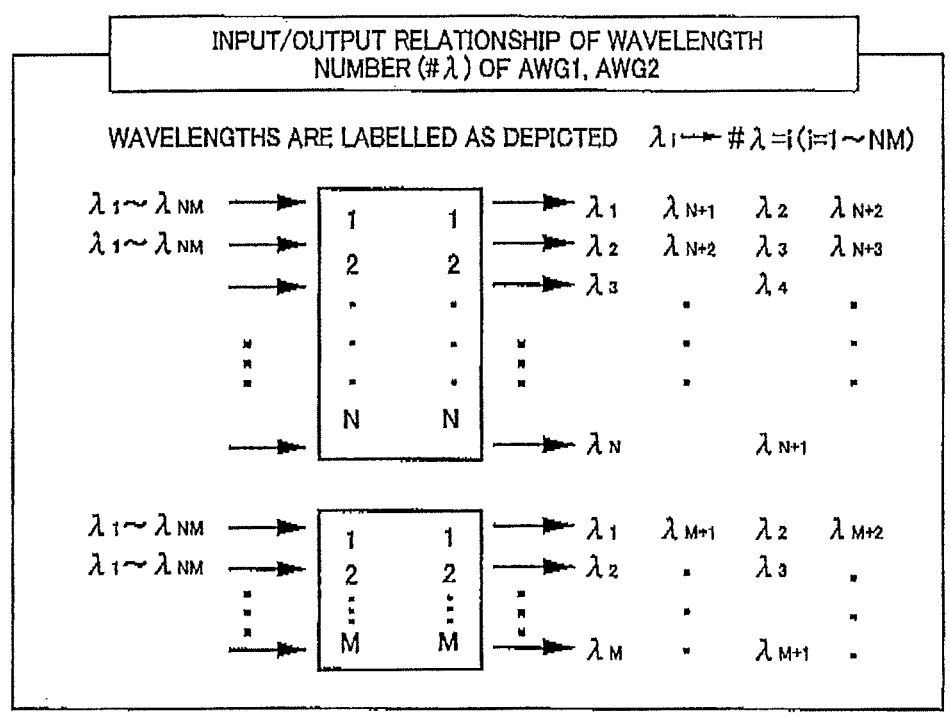
FIG. 33 is a diagram indicating wavelength numbers and a relationship of input/output of the first cyclic AWGs 1 and the second cyclic AWGs 2 in a interconnection between the first cyclic AWGs 1 and the second cyclic AWGs 2 of FIG. 31.

As depicted in FIG. 33, as apparent from labeling of wavelength numbers of input/output of the first cyclic AWGs 1 and the second cyclic AWGs 2, when numbers are given to the first cyclic AWGs 1 and the input ports thereof as well as the second cyclic AWGs 2 and the output ports thereof, the numbers are correlated with a wavelength number satisfying the following relationships (2) and (3) by using a wiring method of FIG. 31.

$$\#\lambda = (\text{input port number of AWG1}) + (\text{number of AWG2 itself}) - 1, \mod N \quad (2)$$

$$\#\lambda = (\text{output port number of AWG2}) + (\text{number of AWG1 itself}) - 1, \mod M \quad (3)$$

Figure 34:
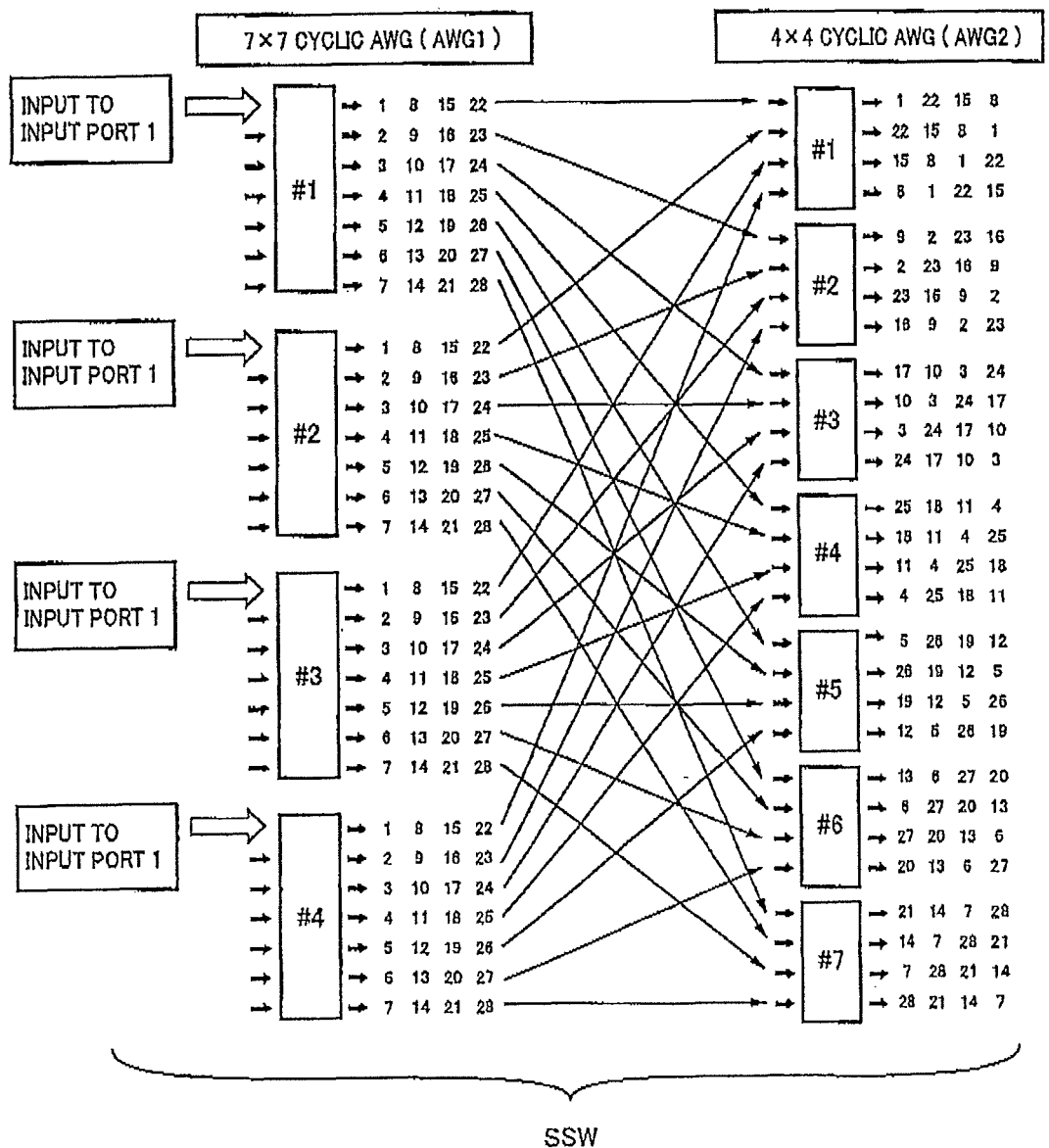
FIG. 34 is a diagram indicating an example of interconnection of the four first cyclic AWGs 1 consisting of 7×7 cyclic AWGs and the seven second cyclic AWGs 2 consisting of 4×4 cyclic AWGs and connections of input/output.
Figure 35:
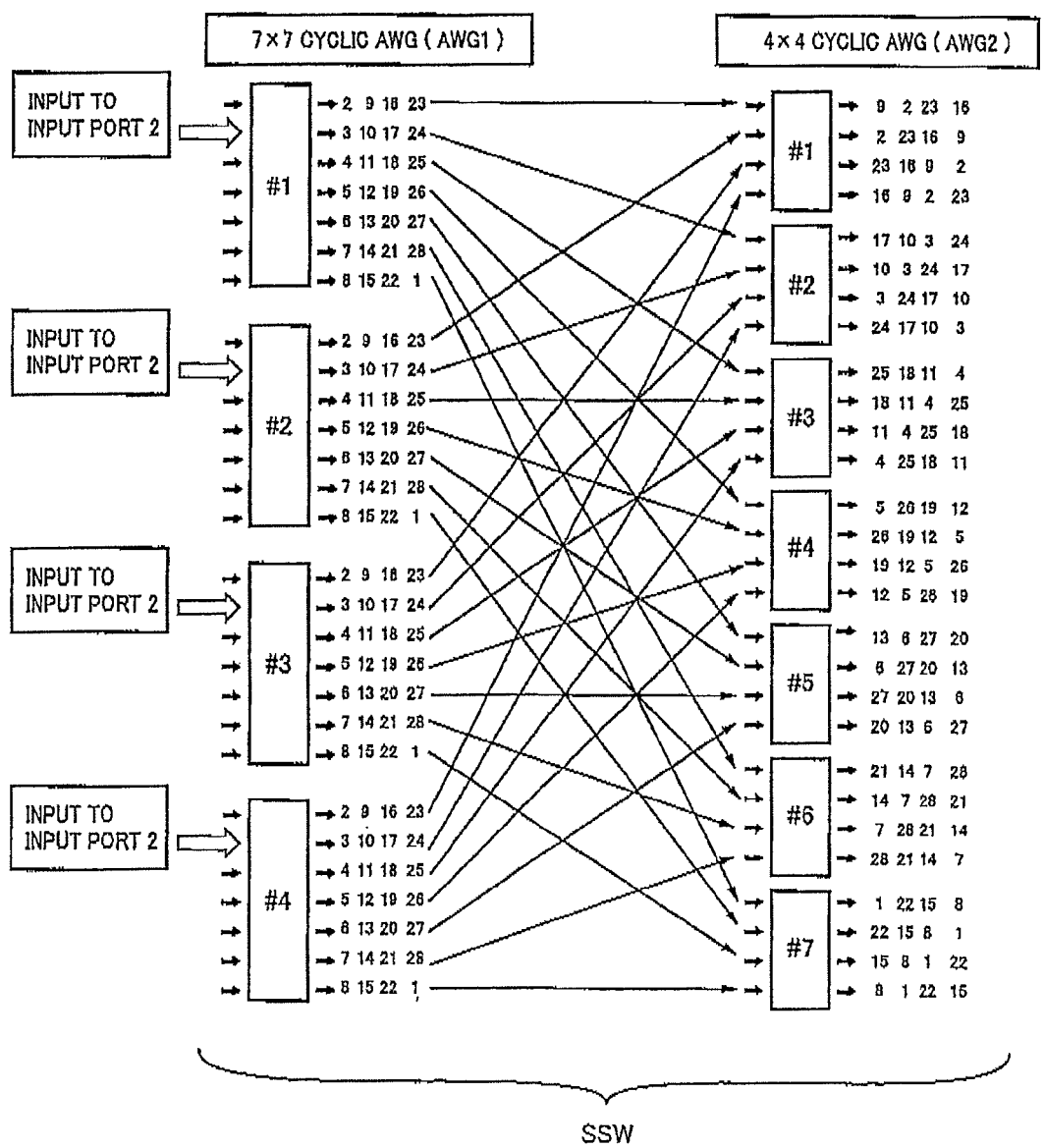
FIG. 35 is a diagram indicating connections of input/output in a case that input positions to the first cyclic AWGs 1 are shifted by one in the spatial switching portion SSW depicted in FIG. 34.

FIG. 34 depicts an example of a configuration of interconnection of the four first cyclic AWGs 1 consisting of 7×7 cyclic AWGs and the seven second cyclic AWGs 2 consisting of 4×4 cyclic AWGs achieved by using the wiring method of FIG. 31. FIG. 35 depicts the case that input positions to the first cyclic AWGs 1 are shifted by one in the spatial switching portion SSW depicted in FIG. 34. This clarifies that a signal can be guided from any input ports of the first cyclic AWGs 1 to output ports of the arbitrary second cyclic AWGs 2.

Figure 36:
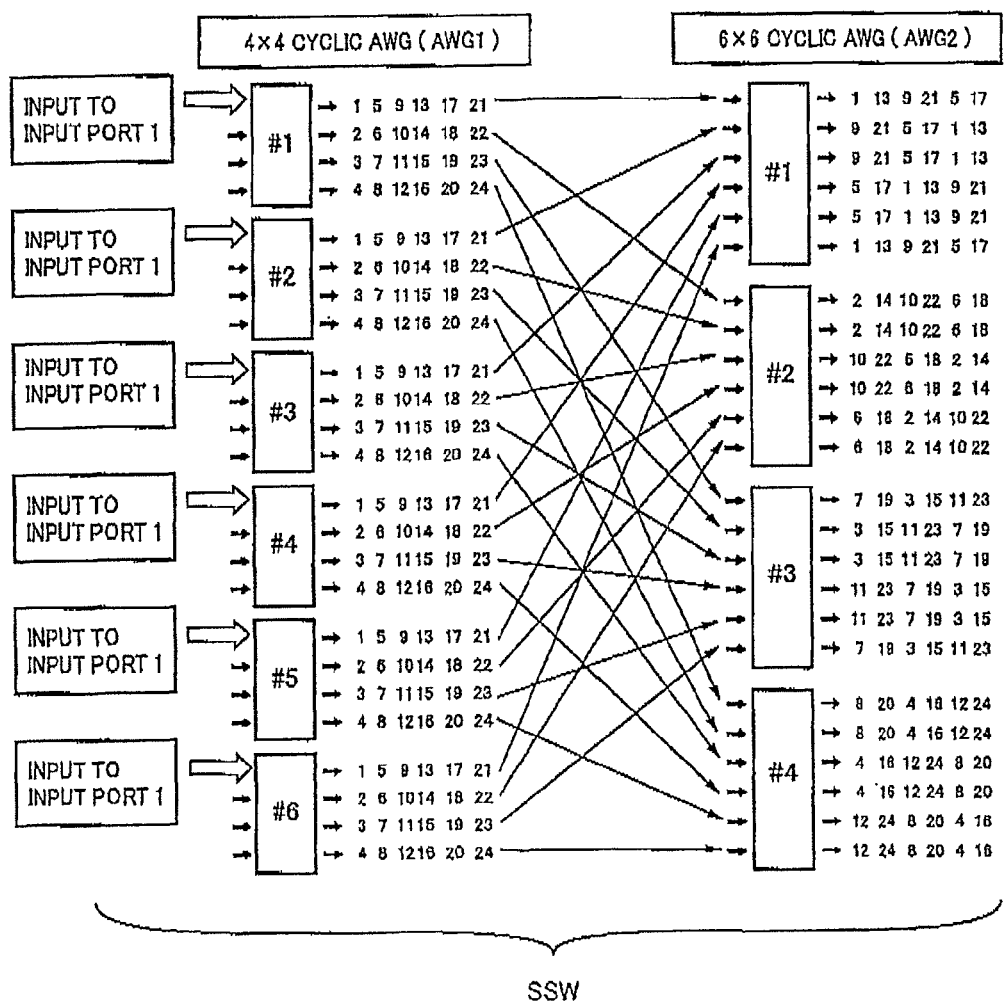
FIG. 36 is a diagram indicating an example of interconnection of the six first cyclic AWGs 1 consisting of 4×4 cyclic AWGs and the four second cyclic AWGs 2 consisting of 6×6 cyclic AWGs and connections of input/output.
Figure 37:
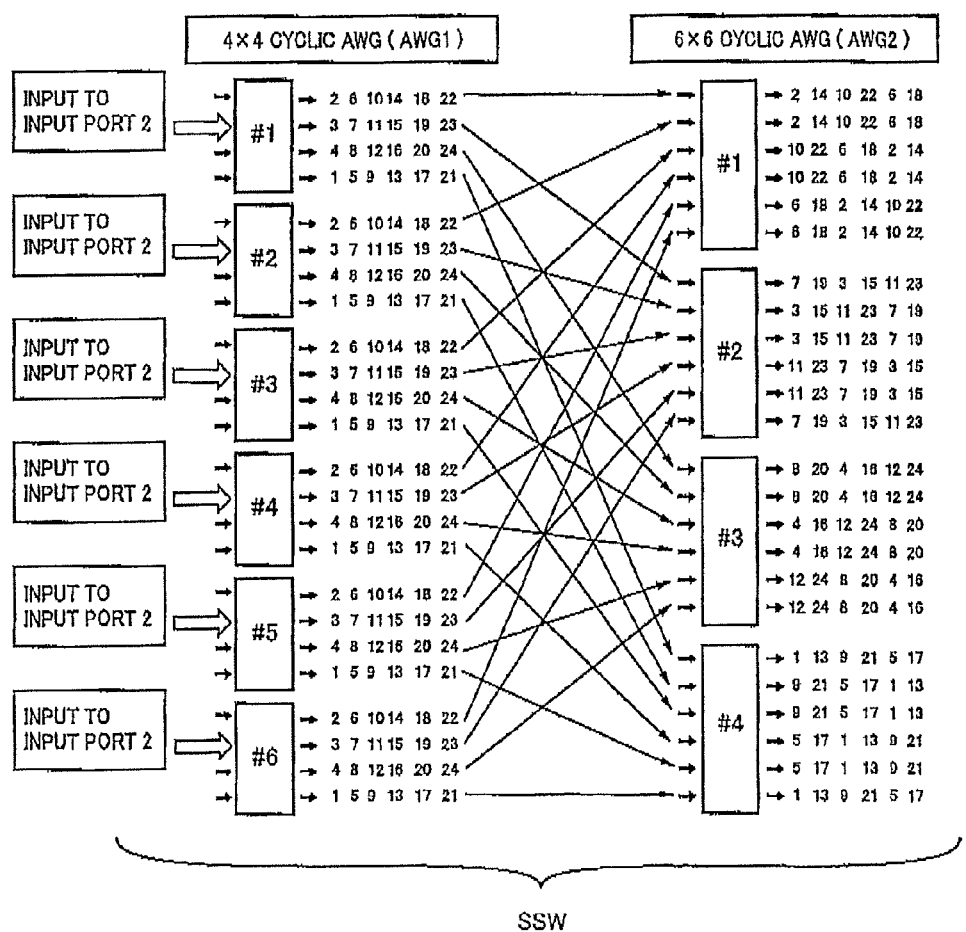
FIG. 37 is a diagram indicating connections of input/output in a case that the input positions to the first cyclic AWG 1 are shifted by one in the spatial switching portion SSW depicted in FIG. 36.
Figure 38:
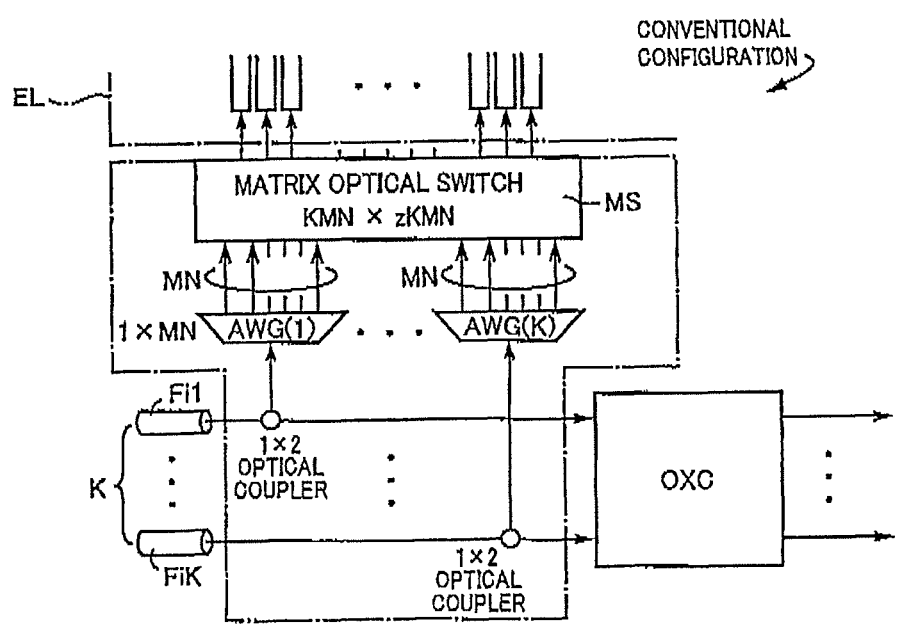
FIG. 38 is a diagram for explaining a configuration of a conventional drop-side optical terminating apparatus.

FIG. 36 depicts an example of a configuration of interconnection of the six first cyclic AWGs 1 consisting of 4×4 cyclic AWGs having a common factor "2" and the four second cyclic AWGs 2 consisting of 6×6 cyclic AWGs achieved by using the wiring method of FIG. 31. FIG. 37 depicts the case that input positions to the first cyclic AWGs 1 are shifted by one in the spatial switching portion SSW depicted in FIG. 36. This clarifies that a signal can be guided from any input ports of the first cyclic AWGs 1 to output ports of the arbitrary second cyclic AWGs 2.

Although not exemplarily illustrated one by one, the present invention may variously be modified within a range not departing from the spirit thereof.

NOMENCLATURE OF ELEMENTS

10: optical signal terminating apparatus RN: node BXC: wavelength-group cross-connect portion WXC: wavelength cross-connect portion AWG(1)-AWG(k): wavelength demultiplexers WLC: signal wavelength converting portion PD: photodiode (electric signal converting element) VWLD: variable wavelength laser KSS: spatial switching apparatus SSW: spatial switching portion AWG: arrayed waveguide gratings

The invention claimed is:
1. A spatial switching apparatus having a plurality of input terminals, an input optical signal of a single wavelength being input to each of the plurality of the input terminals, and a plurality of output terminals, an output optical signal of a single wavelength being output from each of the plurality of the output terminals, comprising:
a signal wavelength converting portion having an electric signal converting element converting the input optical signal into an electric signal, and a variable wavelength laser, the signal wavelength converting portion using the variable wavelength laser to convert the electric signal converted by the electric signal converting element into an optical signal of an arbitrary wavelength; and
a spatial switching portion having a plurality of first cyclic arrayed waveguide gratings (AWGs) performing output from a plurality of output ports respectively corresponding to wavelengths of a plurality of arrayed waveguide grating input signals input from the variable wavelength laser, and a plurality of second cyclic arrayed waveguide gratings having a same total number of input ports as a total number of the plurality of the output ports of the plurality of the first cyclic arrayed waveguide gratings, the spatial switching portion routing and outputting the arrayed waveguide grating input signal from one of a plurality of output ports of the second cyclic arrayed waveguide gratings, the one output port corresponding to a wavelength of the arrayed waveguide grating input signal, wherein each one of the first cyclic waveguide gratings is connected to each of the second cyclic arrayed waveguide gratings, a number of input ports and a number of output ports each of first cyclic arrayed waveguide gratings are the same, and a number of input ports and a number of output ports of each of the second cyclic arrayed waveguide gratings are the same, a number of output ports of each of the first cyclic arrayed waveguide gratings and a number of input ports of each of the second cyclic arrayed waveguide gratings are relatively prime to each other, and a number of input/output ports of each of the second cyclic arrayed waveguide gratings and a number of the input/output ports of each of the second cyclic arrayed waveguide gratings are different numbers to each other.

2. The spatial switching apparatus of claim 1, further comprising:

n−1 additional spatial switching portions, wherein 1×n optical switches are disposed between the signal wavelength converting portion and the n spatial switching portions.

3. The spatial switching apparatus of claim 2, wherein an m×1 optical combiner is disposed between the 1×n optical switches and the first cyclic arrayed waveguide gratings, and wherein the m×1 optical combiner multiplexes and inputs output signals of m 1×n optical switches to one input port of one of the first cyclic arrayed waveguide gratings.

4. A spatial switching apparatus having a plurality of input terminals, an input optical signal of a single wavelength being input to each of the plurality of the input terminals, and a plurality of output terminals, an output optical signal of a single wavelength being output from each of the plurality of the output terminals, comprising:

a signal wavelength converting portion having an electric signal converting element converting the input optical signal into an electric signal, and a variable wavelength laser, the signal wavelength converting portion using the variable wavelength laser to convert the electric signal converted by the electric signal converting element into an optical signal of an arbitrary wavelength; and a spatial switching portion having a plurality of first cyclic arrayed waveguide gratings (AWGs) performing output from a plurality of output ports respectively corresponding to wavelengths of a plurality of arrayed waveguide grating input signals input from the variable wavelength laser, and a plurality of second cyclic arrayed waveguide gratings having a same total number of input ports as a total number of the plurality of the output ports of the plurality of the first cyclic arrayed waveguide gratings, the spatial switching portion routing and outputting the arrayed waveguide grating input signal from one of a plurality of output ports of the second cyclic arrayed waveguide gratings, the one output port corresponding to a wavelength of the arrayed waveguide grating input signal, wherein each one of the first cyclic arrayed waveguide gratings is connected to each of the second cyclic arrayed waveguides gratings, a number of the input ports and a number of the output ports of each of the first cyclic arrayed waveguide gratings are the same, and a number of the input ports and a number of the output ports of each of the second cyclic arrayed waveguide gratings are the same, a number of input/output ports of each of the first cyclic arrayed waveguide gratings and a number of input/output ports of each of the second cyclic arrayed waveguide gratings have a common factor to each other, a number of input/output ports of the first cyclic arrayed waveguide gratings and a number of the input/output ports of each of the second cyclic arrayed waveguide gratings are different numbers to each other, 1×n optical switches are disposed between the signal wavelength converting portion and the spatial switching portion, and n is a same number as the common factor.

5. The spatial switching apparatus of claim 4, wherein an m×1 optical combiner is disposed between the 1×n optical switches and the first cyclic arrayed waveguide gratings, and wherein the m×1 optical combiner multiplexes and inputs output signals of m 1×n optical switches to one input port of one of the first cyclic arrayed waveguide gratings.

6. The spatial switching apparatus of claim 5, wherein n and m are equal in the spatial switching apparatus.

* * * * *